(12) United States Patent
Nishi

(10) Patent No.: US 12,595,006 B2
(45) Date of Patent: Apr. 7, 2026

(54) CRAWLER TRAVELING DEVICE, AND WORKING MACHINE INCLUDING CRAWLER TRAVELING DEVICE

(71) Applicant: KUBOTA CORPORATION, Osaka (JP)

(72) Inventor: Keishiro Nishi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 904 days.

(21) Appl. No.: 17/843,331

(22) Filed: Jun. 17, 2022

(65) Prior Publication Data

US 2022/0315137 A1 Oct. 6, 2022

Related U.S. Application Data

(63) Continuation of application No. PCT/JP2020/047683, filed on Dec. 21, 2020.

(30) Foreign Application Priority Data

Jan. 14, 2020 (JP) ................................. 2020-003766

(51) Int. Cl.
*A61G 5/10* (2006.01)
*B62D 55/10* (2006.01)
(Continued)

(52) U.S. Cl.
CPC ............ *B62D 55/112* (2013.01); *B62D 55/10* (2013.01); *B62D 55/14* (2013.01); *B62D 55/30* (2013.01)

(58) Field of Classification Search
CPC ...... B62D 55/00; B62D 55/112; B62D 55/10; B62D 55/30; B62D 55/32; B62D 55/06; B62D 55/084; B52D 55/14
(Continued)

(56) References Cited

U.S. PATENT DOCUMENTS 6,199,646 B1 * 3/2001 Tani ..................... B62D 55/104
180/9.5
9,505,454 B1 * 11/2016 Kautsch ............... B62D 55/112
(Continued)

FOREIGN PATENT DOCUMENTS

CA 2744681 A1 * 12/2011 ............. B62D 55/04
JP 57-143987 U 9/1982
(Continued)

OTHER PUBLICATIONS

Official Communication issued in corresponding Japanese Patent Application No. 2020-003766, mailed on Dec. 20, 2022.
(Continued)

*Primary Examiner* — Valentin Neacsu
*Assistant Examiner* — Nabin Kumar Sharma
(74) *Attorney, Agent, or Firm* — Keating & Bennett, LLP

(57) ABSTRACT

A crawler traveling device includes a first wheel; a second wheel spaced from the first wheel; a support frame that supports the first wheel and the second wheel; a third wheel disposed above the support frame; an endless crawler wound around the first wheel, the second wheel, and the third wheel; and a vehicle-height changing mechanism that changes a position of the support frame in the vertical direction with respect to the third wheel. The vehicle-height changing mechanism has an actuator that is capable of contracting in the vertical direction and that changes the position of the support frame in the vertical direction with respect to the third wheel.

11 Claims, 12 Drawing Sheets

(51) Int. Cl.

| | |
|---|---|
| *B62D 55/112* | (2006.01) |
| *B62D 55/14* | (2006.01) |
| *B62D 55/30* | (2006.01) |

(58) Field of Classification Search

USPC ...................................................... 180/9, 9.5

See application file for complete search history.

(56) References Cited

U.S. PATENT DOCUMENTS

| | | | | |
|---|---|---|---|---|
| 2002/0070059 A1* | 6/2002 | Hikari | .................... | B62D 55/02 |
| | | | | 180/9.5 |
| 2004/0135433 A1* | 7/2004 | Inaoka | ................. | B62D 55/244 |
| | | | | 305/157 |
| 2013/0154345 A1 | 6/2013 | Schulz et al. | | |
| 2019/0232504 A1 | 8/2019 | Radetzki et al. | | |

FOREIGN PATENT DOCUMENTS

| | | | | | |
|---|---|---|---|---|---|
| JP | H09136676 A | * | 5/1997 | ........... | B62D 55/065 |
| JP | H10218042 A | * | 8/1998 | | |
| JP | 2001048066 A | * | 2/2001 | ............ | B62D 55/02 |
| JP | 2005-144631 A | | 6/2005 | | |
| JP | 2013086766 A | * | 5/2013 | | |
| JP | 2015-155302 A | | 8/2015 | | |
| JP | 2016-214189 A | | 12/2016 | | |
| JP | 2018-122713 A | | 8/2018 | | |
| JP | 2019-177862 A | | 10/2019 | | |
| WO | 2011/067470 A1 | | 6/2011 | | |
| WO | WO-2015108104 A1 | * | 7/2015 | ........... | B62D 55/104 |

OTHER PUBLICATIONS

Official Communication issued in International Patent Application No. PCT/JP2020/047683, mailed on Mar. 9, 2021.

\* cited by examiner

CRAWLER TRAVELING DEVICE, AND WORKING MACHINE INCLUDING CRAWLER TRAVELING DEVICE

CROSS REFERENCE TO RELATED APPLICATIONS

This application is a continuation application of International Application No. PCT/JP2020/047683, filed on Dec. 21, 2020, which claims the benefit of priority to Japanese Patent Application No. 2020-003766, filed on Jan. 14, 2020. The entire contents of each of these applications are hereby incorporated herein by reference.

BACKGROUND OF THE INVENTION

1. Field of the Invention

The present invention relates to a crawler traveling device, and a working machine such as a tractor including the crawler traveling device.

2. Description of the Related Art

In the related art, the crawler traveling device disclosed in Japanese Unexamined Patent Application Publication No. 2015-155302 includes a first wheel (front/rear driven wheel); a second wheel (front/rear driven wheel) that is spaced from the first wheel; a support frame (truck frame) that supports the first wheel and the second wheel; a third wheel (driving wheel) that is disposed above the support frame; and an endless crawler that is wound around the first wheel, the second wheel, and the third wheel. The support frame has a tension adjusting mechanism that supports the first wheel and that adjusts the tension of the crawler.

SUMMARY OF THE INVENTION

The crawler traveling device in Japanese Unexamined Patent Application Publication No. 2015-155302 can achieve stability of the first wheel, and the like.

However, when a step of a ridge or the like or an obstacle is relatively large, a crawler traveling device such as that in Japanese Unexamined Patent Application Publication No. 2015-155302 may be impossible to climb over the step or the obstacle since the vehicle height of a working machine that includes the crawler traveling device is constant and the lower surface of the working machine may come into contact with the step or the obstacle. In addition, depending on work of the working machine, the position thereof in the vertical direction is required to be adjusted.

Preferred embodiments of the present invention provide a crawler traveling device capable of improving traveling performance and working performance, and a working machine that includes the crawler traveling device.

A crawler traveling device according to one aspect of the present invention includes a first wheel; a second wheel that is spaced from the first wheel; a support frame that supports the first wheel and the second wheel; a third wheel that is disposed above the support frame; an endless crawler that is wound around the first wheel, the second wheel, and the third wheel; and a vehicle-height changing mechanism that changes a position of the support frame in a vertical direction with respect to the third wheel.

The vehicle-height changing mechanism may have a first actuator that is capable of contracting in the vertical direction and that changes the position of the support frame in the vertical direction with respect to the third wheel.

In the crawler traveling device, the first actuator may be a hydraulic cylinder that is driven to extend and contract by a hydraulic fluid delivered by a hydraulic pump.

The crawler traveling device may include a mount frame that supports the third wheel. The first actuator may extend in the vertical direction and may couple the support frame and the mount frame to each other. The first actuator may change a distance between the support frame and the mount frame to change the position of the support frame in the vertical direction with respect to the third wheel.

The crawler traveling device may include a third spindle that supports the third wheel at the mount frame. A pair of the first actuators may be disposed at front and rear of the third spindle.

The first wheel and the second wheel may be driven wheels that apply tension to the crawler. The third wheel may be a driving wheel that is rotatably driven by power transmitted thereto.

The crawler traveling device may include a distance changing mechanism that is provided at the support frame and that changes a distance between the first wheel and the second wheel.

The distance changing mechanism may have a second actuator that is capable of contracting in a front-rear direction and that extends and contracts the support frame in the front-rear direction to change the distance between the first wheel and the second wheel.

In the crawler traveling device, the second actuator may be a hydraulic cylinder that is driven to extend and contract by a hydraulic fluid delivered by a hydraulic pump.

The crawler traveling device may include a plurality of rollers that are attached to the support frame and that are spaced from each other. A distance between, among the plurality of rollers, the roller adjacent to the first wheel and the first wheel may be longer than a distance between the roller adjacent to the second wheel and the second wheel.

A working machine includes a plurality of the crawler traveling devices, and a machine body that has a mount portion on which a working device is mountable. The plurality of crawler traveling devices include a crawler traveling device that is provided on one side in a width direction of the machine body and a crawler traveling device that is provided on another side in the width direction.

A working machine includes a plurality of the crawler traveling devices, and a machine body that has a mount portion on which a working device is mountable. The plurality of crawler traveling devices include a pair of crawler traveling devices that are spaced from each other in a width direction of the machine body and that are provided at a front portion of the machine body, and a pair of crawler traveling devices that are spaced from each other in the width direction and that are provided at a rear portion of the machine body.

The working machine may include a battery unit that stores electric power, and a charging display portion capable of displaying information on charging of the battery unit. The machine body may have an exterior body that houses equipment and/or a device provided at the machine body. The charging display portion may be provided at the exterior body and may report a state of the battery unit to the outside.

The working machine may include a battery unit that stores electric power, and a charging display portion that is capable of displaying information on charging of the battery unit. The machine body may have an exterior body that houses equipment and/or a device provided at the machine body. The charging display portion may be provided at the exterior body and may be disposed between the pair of crawler traveling devices provided at the front portion of the machine body and the pair of crawler traveling devices provided at the rear portion of the machine body. The charging display portion may report a state of the battery unit to the outside.

Each vehicle-height changing mechanism may independently change a position of the support frame in the vertical direction with respect to the third wheel.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
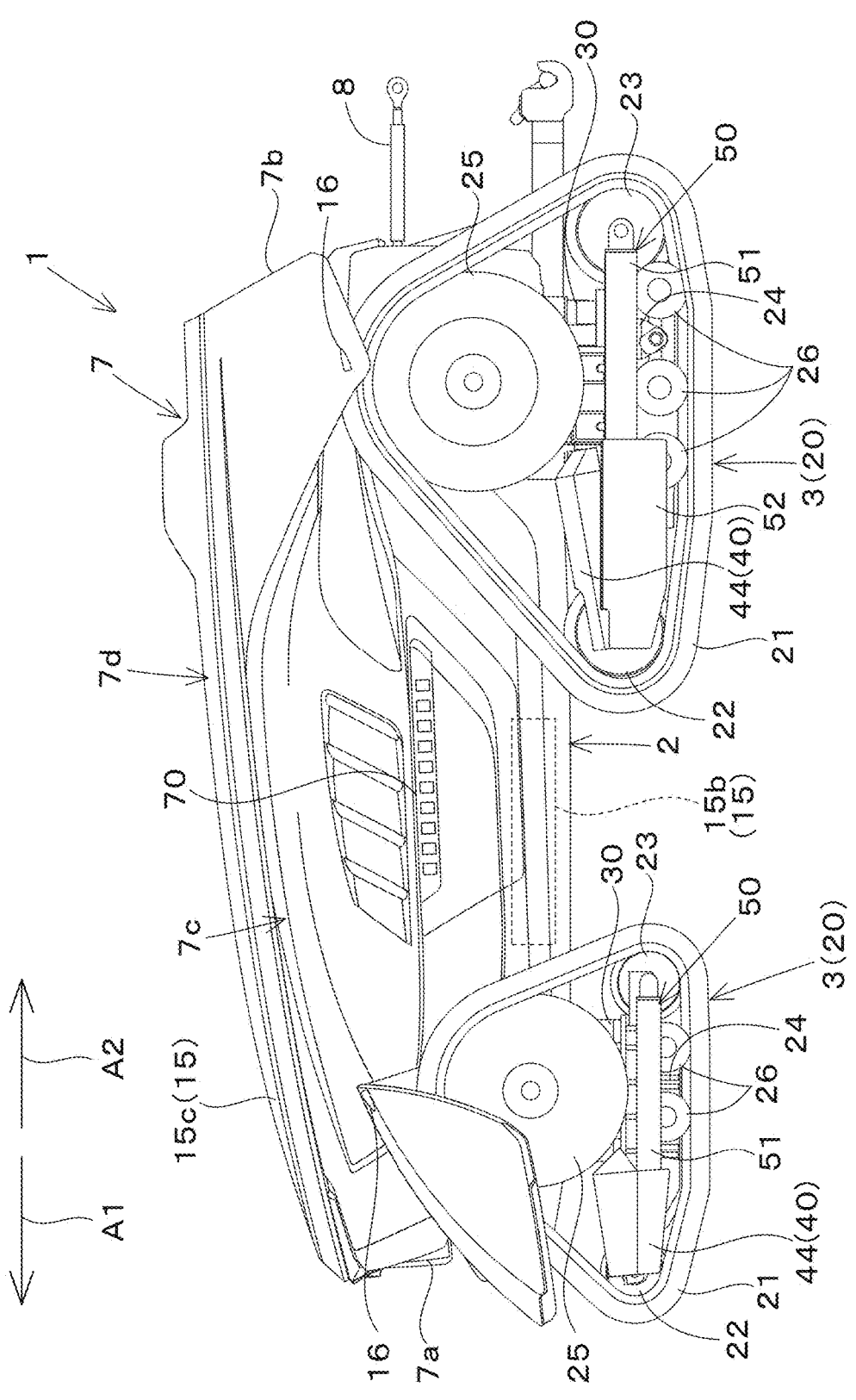
FIG. 1 is a schematic side view illustrating a working machine in a first preferred embodiment of the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

First Preferred Embodiment

Figure 2:
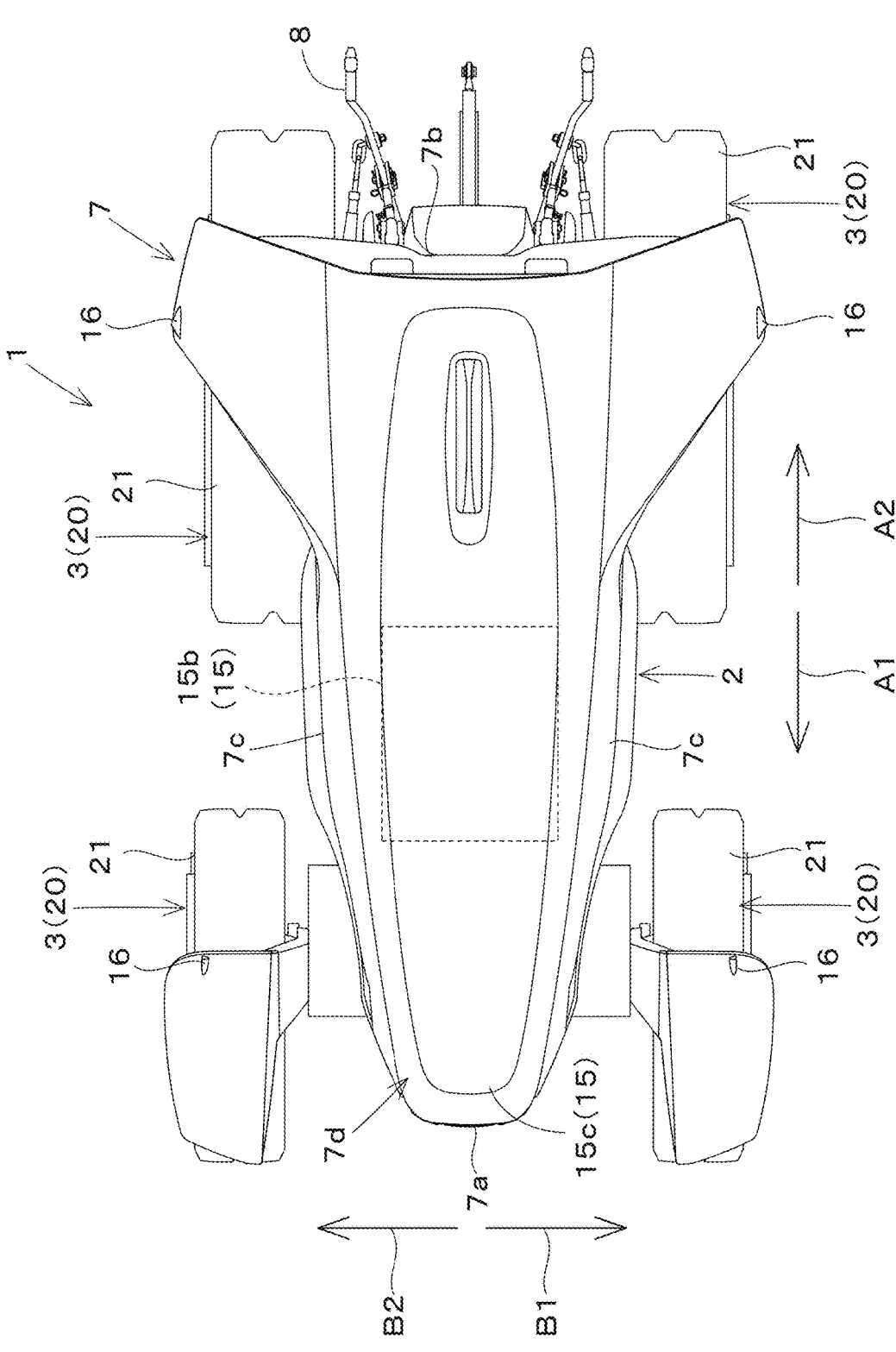
FIG. 2 is a schematic plan view illustrating the working machine in the first preferred embodiment of the present invention.

Hereinafter, one preferred embodiment of the present invention will be described with reference to the drawings. FIG. 1 and FIG. 2 each illustrate a tractor, which is one example of a working machine 1. While the working machine 1 will be described by presenting a tractor as an example, the working machine 1 is not limited to the tractor and may be construction machinery such as a backhoe, a wheel loader, or the like that includes a mount portion on which a working device is mountable, agricultural machinery such as a combine, a rice transplanter, or the like, or various types of a vehicle or the like. In preferred embodiments of the present invention, the arrow A1 direction in FIG. 1 and FIG. 2 will be described as forward, the arrow A2 direction in FIG. 1 and FIG. 2 will be described as rearward, the near side in FIG. 1 and the arrow B1 direction in FIG. 2 will be described as leftward, and the far side in FIG. 1 and the arrow B2 direction in FIG. 2 will be described as rightward. In addition, the horizontal direction, which is a direction orthogonal to the front-rear direction of the working machine 1, will be described as the width direction. A direction from a central portion in a width direction toward the right or the left will be described as width-direction outward. A direction opposite to the width-direction outward will be described as the width-direction inward.

Figure 3:
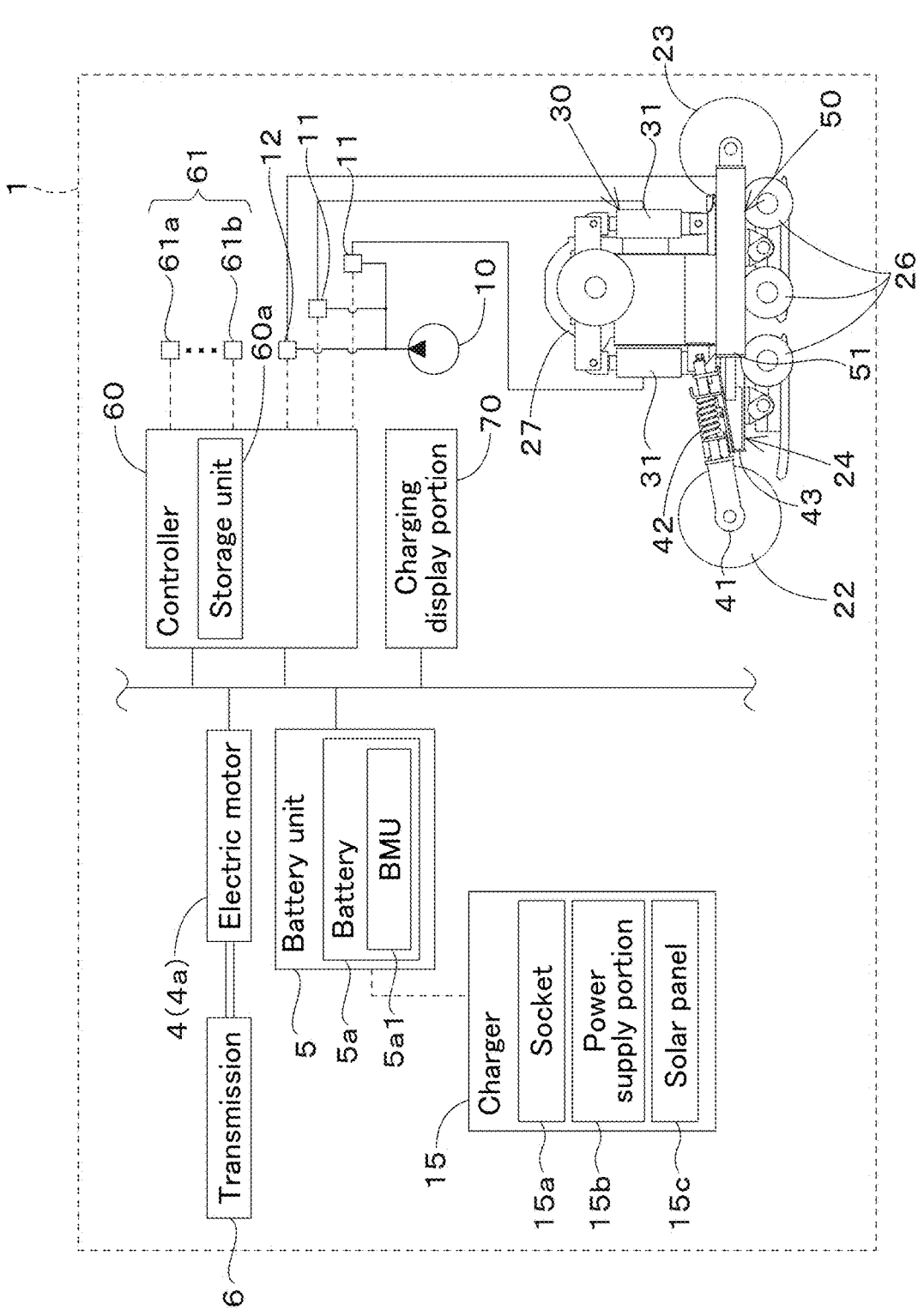
FIG. 3 is a diagram describing a system of the working machine in the first preferred embodiment of the present invention.

As illustrated in FIG. 1, the working machine 1 includes a machine body (traveling vehicle body) 2 and at least one traveling device 3 that supports the machine body 2 to be capable of traveling. As illustrated in FIG. 3, the working machine 1 also includes a prime mover 4 and a transmission 6. The traveling device 3 is a device that causes the machine body 2 to travel and applies a propulsive force to the machine body 2. For example, the machine body 2 is provided with a plurality of the traveling devices 3.

The prime mover 4 is an electric motor 4a, a diesel engine, or the like. The prime mover 4 drives a hydraulic pump 10 that actuates, for example, a hydraulic machine provided at the working machine 1. The hydraulic pump 10 is caused by power output by the prime mover 4 to deliver a hydraulic fluid. In the present preferred embodiment, the prime mover 4 is the electric motor 4a that is driven by electric power stored in a battery unit 5 provided at the machine body 2.

The transmission 6 can switch the propulsive force of the traveling device 3 by gear shifting and can switch forward traveling and rearward traveling of the traveling device 3.

As illustrated in FIG. 1 and FIG. 2, the machine body 2 has an exterior body 7. The exterior body 7 houses machines and devices (for example, the prime mover 4, the battery unit 5, and the like) provided at the machine body 2. As illustrated in FIG. 1 and FIG. 2, the exterior body 7 extends from a front portion to a rear portion of the machine body 2 and houses the prime mover 4 and the battery unit 5 in a space (housing space) formed in the inside thereof. The exterior body 7 has a front wall 7a that forms a front portion of the housing space, a rear wall 7b that forms a rear portion of the housing space, a pair of side walls 7c that form side portions of the housing space, and an upper wall 7d that forms an upper portion of the housing space.

The front wall 7a is disposed at a front portion of the machine body 2 and is provided with, for example, a head lamp unit. The rear wall 7b is disposed at a rear portion of the machine body 2 and is spaced from the front wall 7a in the front-rear direction. The rear wall 7b is provided with, for example, a tail lamp unit. In the pair of side walls 7c, the side wall 7c at the left is disposed at the left of the machine body 2 and couples the left end of the front wall 7a and the left end of the rear wall 7b to each other. In the pair of side walls 7c, the side wall 7c at the right is disposed at the right of the machine body 2 and couples the right end of the front wall 7a and the right end of the rear wall 7b to each other. The pair of side walls 7c are thus spaced from each other in the width direction. The upper wall 7d extends from a front portion to a rear portion of the machine body 2 and is disposed at an upper location. The upper wall 7d couples the upper end of the front wall 7a, the upper end of the rear wall 7b, and the upper ends of the pair of side walls 7c to each other.

As illustrated in FIG. 1 and FIG. 2, the machine body 2 has a mount portion 8. A working device is mountable on the mount portion 8. The mount portion 8 couples the working device to the machine body 2. The mount portion 8 is provided at, for example, a rear portion of the machine body 2. The mount portion 8 includes a swinging drawbar, which does not raise or lower the working device, and a raising/lowering device, including a three-point linkage mechanism and the like, which raises and lowers the working device. By coupling the working device to the mount portion 8, the machine body 2 can tow the working device. The position of the mount portion 8 is, however, not limited to a rear portion of the machine body 2. The mount portion 8 may be provided at a front portion of the machine body (swivel substrate), similarly to a backhoe or the like. The configuration of the mount portion 8 is not limited to the aforementioned configuration.

The working device is a device that is mounted on the mount portion 8 and that performs predetermined work. The working device includes a cultivator for cultivation, a transplanter that plants seedlings, a mower for mowing grass or the like, a tedder for tedding grass or the like, a rake for raking grass or the like, a baler for baling grass or the like, a fertilizer applicator (broadcaster), an agricultural chemical spreader for spreading an agricultural chemical, a water spreader for watering, and the like.

Hereinafter, the traveling device 3 will be described in detail. As illustrated in FIG. 1 and FIG. 2, a plurality of the traveling devices 3 are provided at the machine body 2. Each of the traveling devices 3 is a crawler traveling device 20 (caterpillar traveling device) that has a crawler 21 and that circulation-drives the crawler 21. The crawler 21 is an iron crawler formed of iron or a rubber crawler formed of rubber, which is an elastic body. The crawler 21 applies a propulsive force to the machine body 2 by being circulation-driven.

As illustrated in FIG. 1 and FIG. 2, the plurality of crawler traveling devices 20 include a pair of crawler traveling devices 20 provided at a front portion of the machine body 2 to be spaced from each other in the width direction of the machine body 2, and a pair of crawler traveling devices 20 provided at a rear portion of the machine body 2 to be spaced from each other in the width direction. That is, a pair of the crawler traveling devices 20 are disposed at a front portion of the machine body 2 in the width direction, and a pair of the crawler traveling devices 20 are disposed at a rear portion of the machine body 2 in the width direction.

As illustrated in FIG. 2, among the plurality of crawler traveling devices 20, the crawler traveling device 20 disposed on one side (left side) of the front portion of the machine body 2 in the width direction and the crawler traveling device 20 disposed on the other side (right side) of the front portion of the machine body 2 in the width direction have the same configuration and are symmetrical to each other in the width direction. Among the plurality of crawler traveling devices 20, the crawler traveling device 20 disposed on one side (left side) of the rear portion of the machine body 2 in the width direction and the crawler traveling device 20 disposed on the other side (right side) of the rear portion of the machine body 2 in the width direction have the same configuration and are symmetrical to each other in the width direction.

As illustrated in FIG. 1, the crawler traveling devices 20 disposed at the front portion of the machine body 2 and the crawler traveling devices 20 disposed at the rear portion of the machine body 2 have similar configurations. Hereinafter, as an example of the crawler traveling devices 20, the crawler traveling device 20 disposed at the left of the rear portion of the machine body 2 will be described, and description of the other crawler traveling devices 20 is omitted.

As illustrated in FIG. 4 to FIG. 7, the crawler traveling device 20 includes a first wheel 22, a second wheel 23, a support frame 24, a third wheel 25, and a plurality of rollers 26. The crawler 21 is wound around the first wheel 22 to the third wheel 25 and the plurality of rollers 26.

As illustrated in FIG. 4 to FIG. 7, the first wheel 22 is disposed at a front portion of the crawler traveling device 20 and rotatable around a first spindle 22a that extends in the width direction. The first wheel 22 is a driven wheel that applies, for example, forward-downward tension to the crawler 21 and that rotates along with circulation-driving of the crawler 21.

As illustrated in FIG. 4 to FIG. 7, the second wheel 23 is disposed at a rear portion of the crawler traveling device 20 and is spaced from the first wheel 22 in the front-rear direction. The second wheel 23 is rotatable around a second spindle 23a that extends in the width direction and that is parallel to the first spindle 22a. The second wheel 23 is a driven wheel that applies, for example, rearward-downward tension to the crawler 21 and that rotates along with circulation-driving of the crawler 21.

As illustrated in FIG. 4 to FIG. 7, the support frame 24 is a long frame member that supports the first wheel 22 and the second wheel 23 and that extends in the front-rear direction. The support frame 24 supports the first wheel 22 and the second wheel 23 to be spaced from each other in the front-rear direction.

Figure 4:
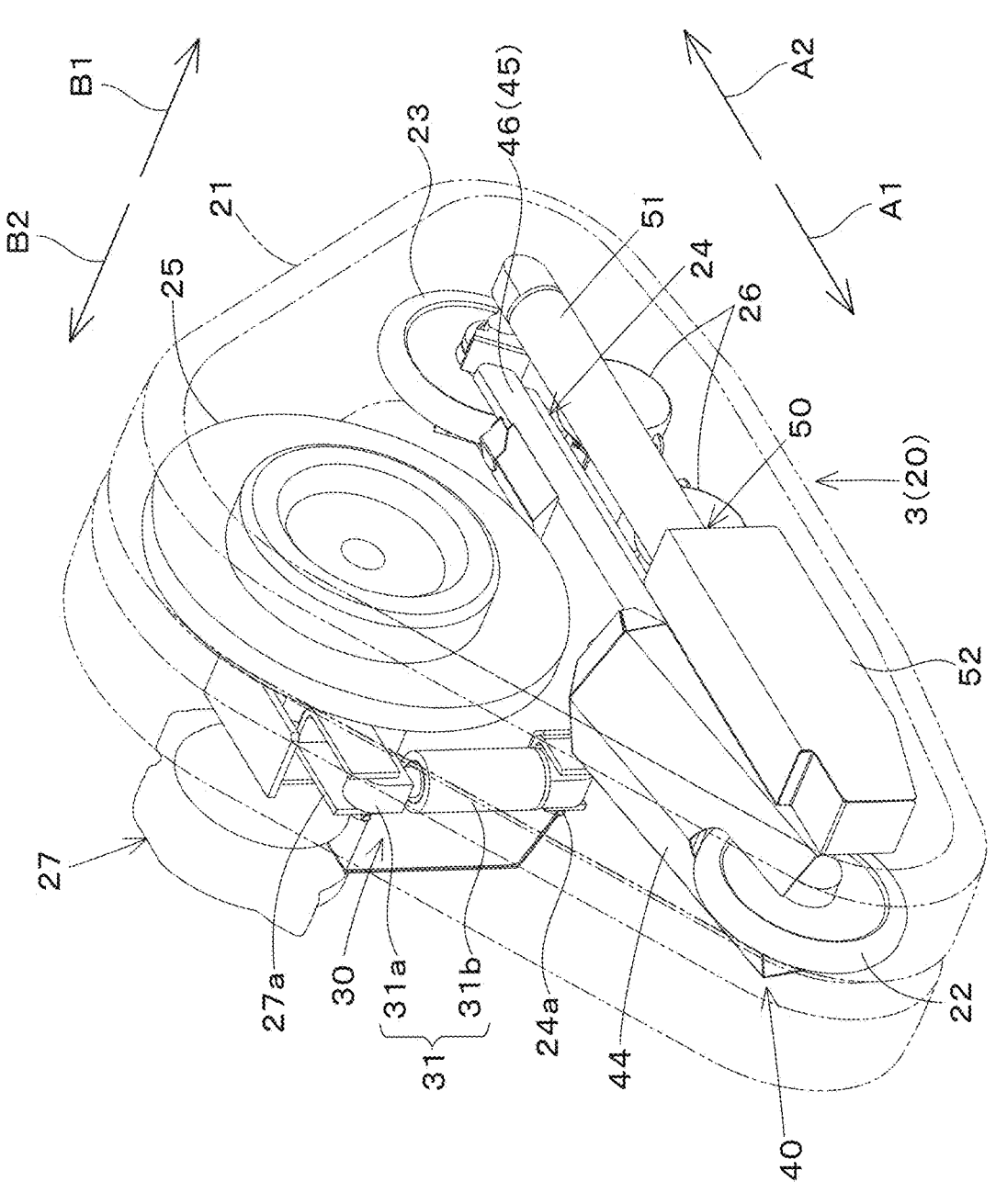
FIG. 4 is a perspective view illustrating a crawler traveling device in the first preferred embodiment of the present invention.
Figure 6:
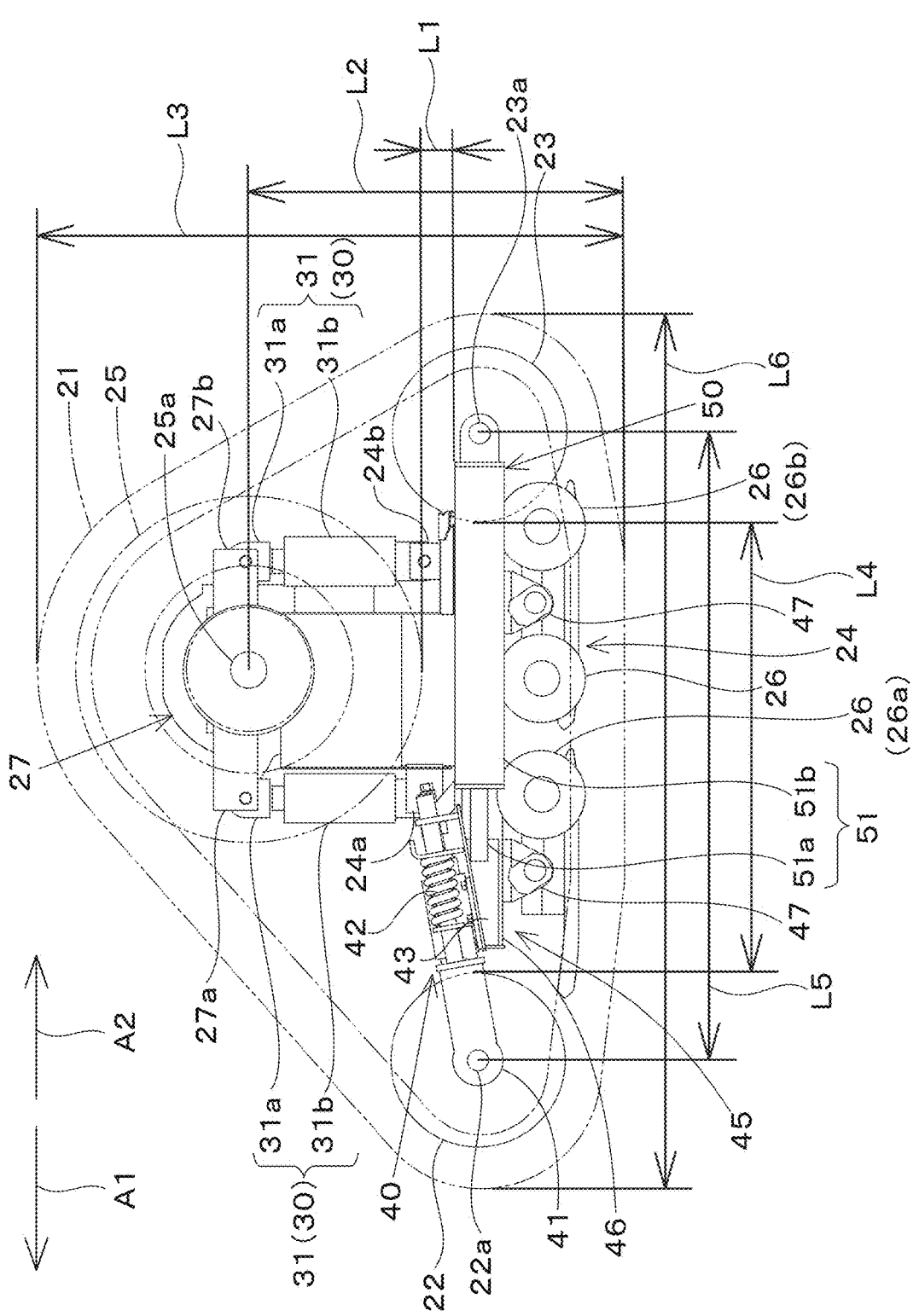
FIG. 6 is a side view illustrating a state (a state in which the vehicle height is low) in which the length of the crawler traveling device in the first preferred embodiment in the vertical direction is shortened of the present invention.
Figure 7:
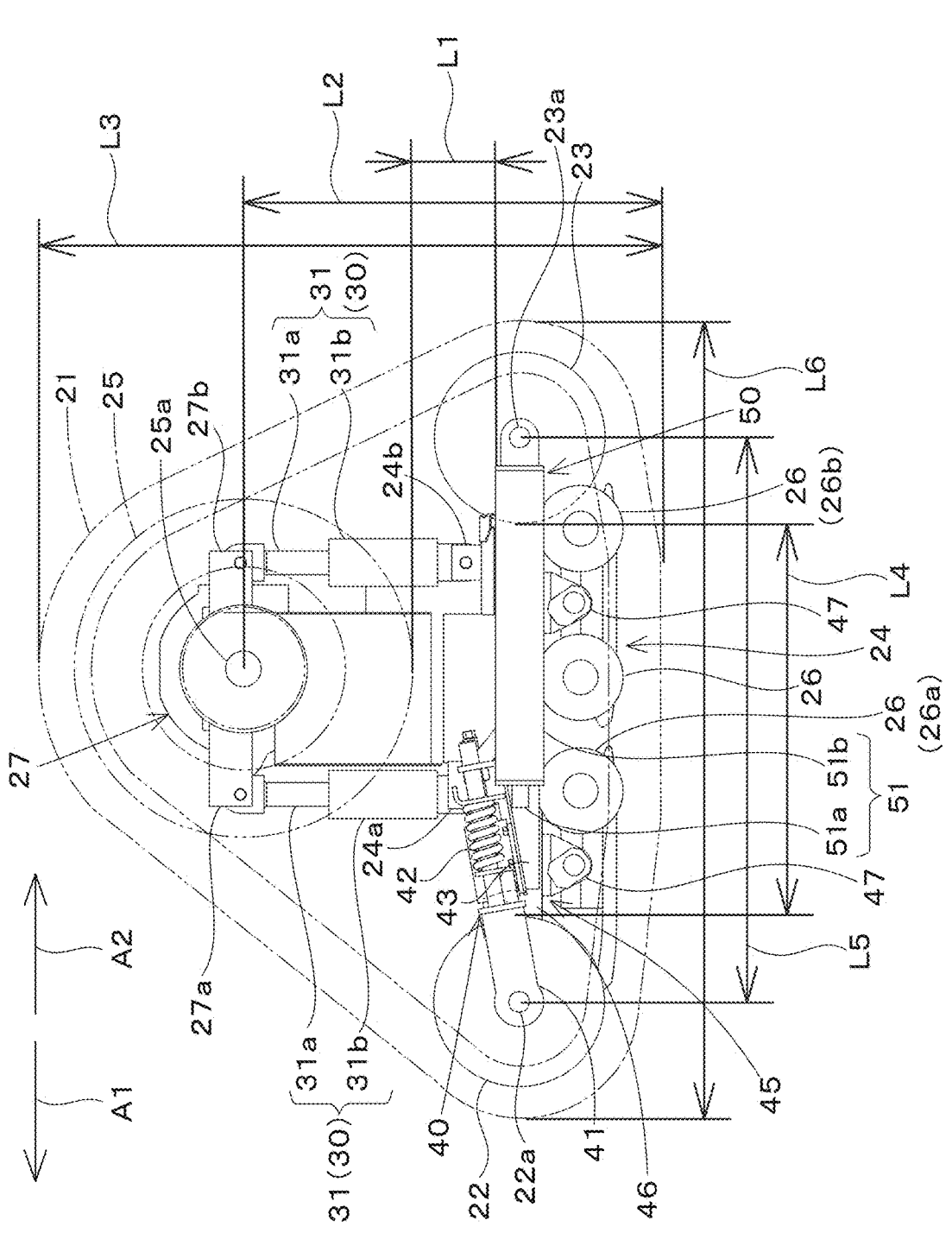
FIG. 7 is a side view illustrating a state (a state in which the vehicle height is high) in which the length of the crawler traveling device in the first preferred embodiment in the vertical direction is lengthened.

As illustrated in FIG. 4, FIG. 6, and FIG. 7, the third wheel 25 is disposed above the support frame 24 and is spaced from the first wheel 22 and the second wheel 23 in the vertical direction. In other words, the first wheel 22 to the third wheel 25 each form a vertex of a triangular shape. The crawler 21 wound around the first wheel 22 to the third wheel 25 draws a substantially triangular shape in side view.

Figure 5:
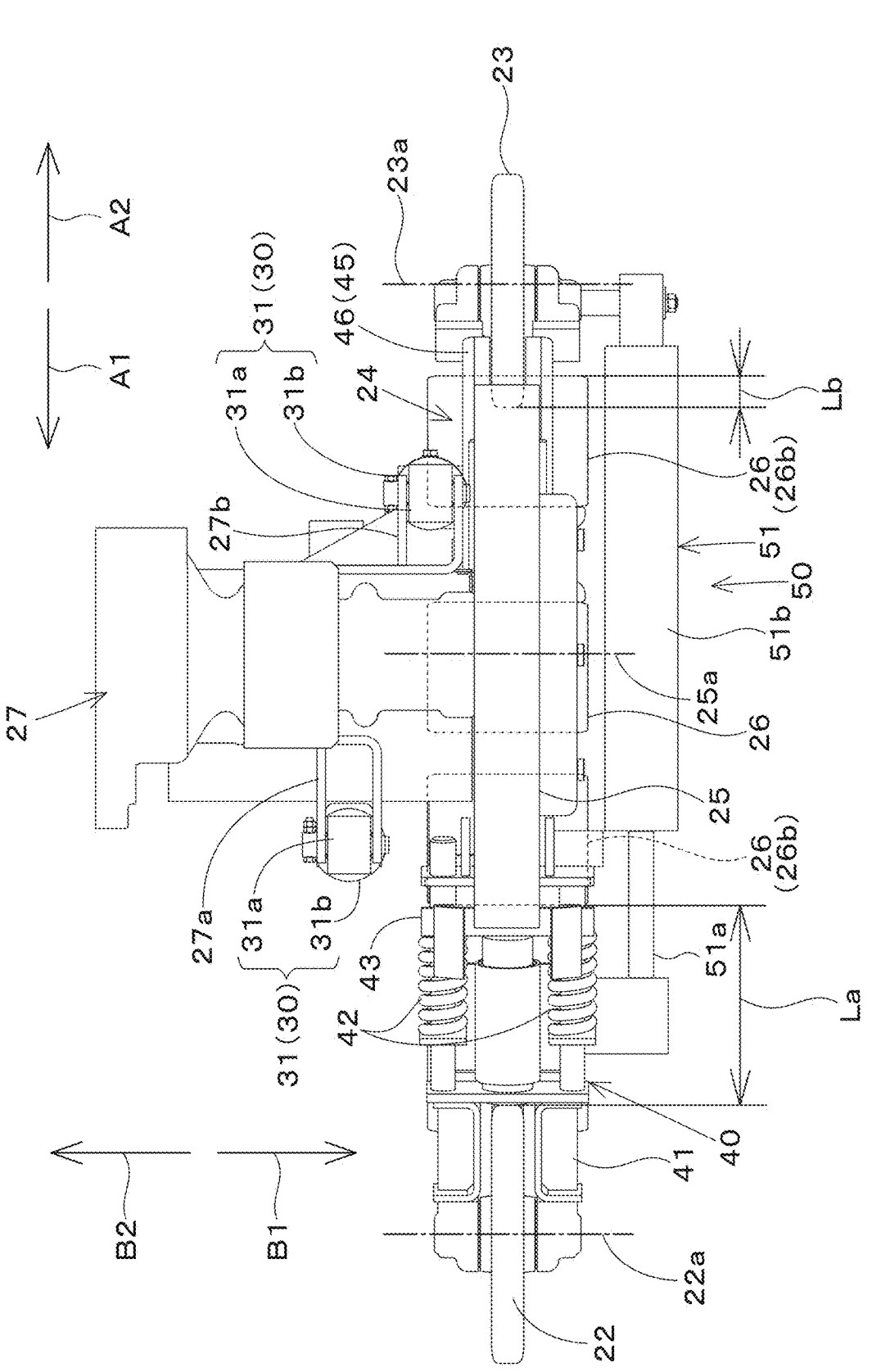
FIG. 5 is a plan view illustrating the crawler traveling device in the first preferred embodiment of the present invention.

As illustrated in FIG. 5, the third wheel 25 is rotatable around a third spindle 25a that extends in the width direction and that is parallel to the first spindle 22a and the second spindle 23a. Specifically, the third wheel 25 is a driving wheel that is rotatably driven by power transmitted thereto. The third wheel 25 applies, for example, upward tension to the crawler 21 and circulation-drives the crawler 21. The third wheel 25 is, for example, a sprocket, which is a drive transmission body including teeth formed at the outer periphery of a disc. The third spindle 25a is connected to the transmission 6. Power is transmitted to the third spindle 25a from the transmission 6, and the third spindle 25a drives the third wheel 25 by the power. The third spindle 25a (third wheel 25) is attached to the machine body 2 via a mount frame 27. The mount frame 27 is formed of a rectangular member, a plate member, a pipe member, or the like and supports the third wheel 25 width-direction outward of the machine body 2. That is, the third wheel 25 at the left is supported leftward of a left portion of the machine body 2 by the mount frame 27.

The plurality of rollers (idler rollers) 26 are attached to the support frame 24 and apply downward tension to the crawler 21. The plurality of rollers 26 are rotatable around a spindle (not illustrated) that extends in the width direction and that is parallel to the first spindle 22a to the third spindle 25a. The plurality of rollers 26 are arranged and supported, below the support frame 24, between the first wheel 22 and the second wheel 23 and are spaced from each other in the front-rear direction. A distance between, among the plurality of rollers 26, the roller 26 (front roller 26a) adjacent to the first wheel 22 and the first wheel 22 is longer than a distance between the roller 26 (rear roller 26b) adjacent to the second wheel 23 and the second wheel 23.

In the present preferred embodiment, as illustrated in FIG. 5, the front roller 26a and the first wheel 22 are spaced from each other by a predetermined distance (clearance La) in the front-rear direction. The rear roller 26b and the second wheel 23 are disposed to overlap each other by a predetermined distance (overlap distance Lb) in the front-rear direction. In each crawler traveling device 20 at the rear, the number of the plurality of rollers 26 is three but may be two, as in each crawler traveling device 20 at the front illustrated in FIG. 1. The number thereof is not limited to the aforementioned number and may be four.

As illustrated in FIG. 4 to FIG. 7, the crawler traveling device 20 includes a vehicle-height changing mechanism 30. The vehicle-height changing mechanism 30 changes the position of the support frame 24 in the vertical direction with respect to the third wheel 25. In other words, the vehicle-height changing mechanism 30 can change a vehicle height, which is a distance from a predetermined position in the working machine 1 to the ground. The vehicle-height changing mechanism 30 has at least one actuator (first actuator) 31 that is capable of contracting in the vertical direction and that changes the position of the support frame 24 in the vertical direction with respect to the third wheel 25. The first actuator 31 is a hydraulic cylinder that can be driven to extend and contract by a hydraulic fluid that is delivered by the hydraulic pump 10. The first actuator 31 is not limited to a hydraulic cylinder and may be a hydraulic jack or the like. As illustrated in FIG. 3, the first actuator 31 is connected to the hydraulic pump 10 via a first control valve 11. The first control valve 11 is a solenoid valve or the like and extends and contracts the first actuator 31 by adjusting the hydraulic fluid that is to be supplied to the first actuator 31.

As illustrated in FIG. 6 and FIG. 7, the first actuator 31 extends in the vertical direction and couples the support frame 24 and the mount frame 27 to each other. In other words, the first actuator 31, the support frame 24, and the mount frame 27 form a truck frame that attaches the first wheel 22 to the third wheel 25, the rollers 26, and the crawler 21 to the machine body 2. The upper end of the first actuator 31 is coupled to the mount frame 27 to be swingable around a spindle in the width direction. The lower end of the first actuator 31 is coupled to the support frame 24 to be swingable around a spindle in the width direction.

As illustrated in FIG. 6 and FIG. 7, a pair of the first actuators 31 are disposed at the front and the rear of the third spindle 25a. The first actuator 31 at the front couples a front portion of the support frame 24 and a front portion of the mount frame 27 to each other. In detail, the upper end (the upper end of a rod 31a of the first actuator 31 at the front in the present preferred embodiment) of the first actuator 31 at the front is coupled in a swingable manner to a first upper-portion bracket 27a disposed at a front upper portion of the mount frame 27. The lower end (the lower end of a cylinder tube 31b of the first actuator 31 at the front in the present preferred embodiment) of the first actuator 31 at the front is coupled in a swingable manner to a first lower-portion bracket 24a disposed width-direction inward of the support frame 24 at the front.

As illustrated in FIG. 6 and FIG. 7, the first actuator 31 at the rear couples a rear portion of the support frame 24 and a rear portion of the mount frame 27 to each other. As illustrated in FIG. 5, the first actuator 31 at the front and the first actuator 31 at the rear are disposed, for example, to be offset in the width direction. In the present preferred embodiment, the first actuator 31 at the rear is disposed outward (leftward) of the first actuator 31 at the front in the width direction. In detail, the upper end (the upper end of the rod 31a of the first actuator 31 at the rear in the present preferred embodiment) of the first actuator 31 at the rear is coupled in a swingable manner to a second upper-portion bracket 27b disposed at a rear upper portion of the mount frame 27. The second upper-portion bracket 27b is positioned width-direction outward (leftward) of the first upper-portion bracket 27a. The lower end (the lower end of the cylinder tube 31b of the first actuator 31 at the rear in the present preferred embodiment) of the first actuator 31 at the rear is coupled in a swingable manner to a second lower-portion bracket 24b disposed width-direction inward of the support frame 24 at the rear. The second lower-portion bracket 24b is positioned width-direction outward (leftward) of the first lower-portion bracket 24a.

When the hydraulic fluid supplied from the hydraulic pump 10 to the first actuators 31 is controlled to extend the first actuators 31 to shift from FIG. 6 to FIG. 7, a distance (first distance L1) between the support frame 24 and the mount frame 27 increases, that is, the position of the support frame 24 in the vertical direction with respect to the third wheel 25 moves downward.

When the hydraulic fluid supplied from the hydraulic pump 10 to the first actuators 31 is controlled to contract the first actuators 31 to shift from FIG. 7 to FIG. 6, the distance (first distance L1) between the support frame 24 and the mount frame 27 decreases, that is, the position of the support frame 24 in the vertical direction with respect to the third wheel 25 moves upward.

When the hydraulic fluid supplied from the hydraulic pump 10 to the first actuators 31 is controlled to extend one of the first actuator 31 at the front and the first actuator 31 at the rear and to contract the other one, the support frame 24 tilts with respect to the machine body 2, and the distance between the support frame 24 and the mount frame 27 increases, that is, the position of the support frame 24 in the vertical direction with respect to the third wheel 25 moves downward.

As illustrated in FIG. 5 to FIG. 7, the support frame 24 has a front support portion 40, which is a part that supports the first wheel 22, and a rear support portion 45, which is a part that supports the second wheel 23. By changing the positions of the front support portion 40 and the rear support portion 45, it is possible to change the distance between the first wheel 22 and the second wheel 23.

As illustrated in FIG. 5 to FIG. 7, the front support portion 40 is, for example, a tension adjusting mechanism that adjusts tension that is to be applied to the crawler 21 by the first wheel 22. The front support portion 40 has a support body 41 that supports the first spindle 22*a*; a tension applicator 42 that is coupled to the support body 41 and that applies tension of the crawler 21 side (front side) to the support body 41; a tilt base 43 that supports the tension applicator 42 to be tilted forward-downward; and a tension cover 44 that covers the tension applicator 42.

As illustrated in FIG. 5 to FIG. 7, the support body 41 and the tilt base 43 are each formed of a rectangular member, a plate member, a pipe member, or the like. The support body 41 and the tilt base 43 are disposed apart from each other in the front-rear direction and coupled to each other via the tension applicator 42. At the front end of the support body 41, a bearing body that branches into two portions spaced from each other in the width direction is formed, and the first spindle 22*a* is rotatably supported via the bearing body. The tension applicator 42 is an elastic body and is a spring in the present preferred embodiment. The tension cover 44 is formed of a rectangular member, a plate member, or the like and covers one side (left side) and the other side (right side) in the width direction of the tension applicator 42 and the upper side thereof.

As illustrated in FIG. 5 to FIG. 7, the rear support portion 45 is a long frame that extends in the front-rear direction and arranges and supports the plurality of rollers 26. The rear support portion 45 has a support column 46 provided to extend in the front-rear direction, and a plurality of swing brackets 47 that support the plurality of rollers 26.

The support column 46 is formed of, for example, a rectangular member, a plate member, a pipe member, or the like and supports, at the rear end thereof, the second spindle 23*a*. At the rear end of the support column 46, a bearing body that branches into two portions spaced from each other in the width direction is formed, and the second spindle 23*a* is rotatably supported via the bearing body. A front portion of the support column 46 supports the front support portion 40 to be slidable in the front-rear direction. Specifically, the front portion of the support column 46 forms a rail that extends in the front-rear direction, and the tilt base 43 is attached to the rail in a slidable manner. Due to the first wheel 22 and the front roller 26*a* being spaced from each other, the tilt base 43 attached to the support column 46 can slide by a distance until when the first wheel 22 and the front roller 26*a* come into contact with each other.

The plurality of swing brackets 47 are each formed of, for example, a rectangular member, a plate member, or the like and can each support, among the plurality of rollers 26, at least one or more rollers 26. In the present preferred embodiment, the plurality of swing brackets 47 can support two rollers 26. At the lower end of the plurality of swing brackets 47, a bearing body that branches into two portions spaced from each other in the width direction is formed, and, via the bearing body, the spindle of one roller 26 is supported at the front, and the spindle of another roller 26 is supported at the rear. The plurality of swing brackets 47 project downward below the support column 46 to stretch from below a front portion to the rear. In detail, the plurality of swing brackets 47 are pivotally supported below the support column 46 to be swingable around an axis that extends in the width direction.

In the present preferred embodiment, the front support portion 40 is the tension adjusting mechanism. However, the configuration thereof is not limited to the configuration described above. The rear support portion 45 may be the tension adjusting mechanism, or a configuration in which the support frame 24 does not have the tension adjusting mechanism may be employed. As long as being configured to be capable of changing the distance between the first wheel 22 and the second wheel 23, the configuration of the support frame 24 is not limited to the configuration described above. The support frame 24 may have a configuration in which a front portion of the support column 46 is formed in a shape of a pipe extending forward and in which the tilt base 43 slides the pipe in the front-rear direction.

As illustrated in FIG. 4 to FIG. 7, the crawler traveling device 20 includes a distance changing mechanism 50 that is provided at the support frame 24 and that changes the distance between the first wheel 22 and the second wheel 23. The distance changing mechanism 50 can contract in the front-rear direction and has a second actuator 51 that contracts the support frame 24 in the front-rear direction, and a cylinder cover 52 that covers the second actuator 51. The second actuator 51 is a hydraulic cylinder that can be driven to extend and contract by the hydraulic fluid delivered by the hydraulic pump 10. The second actuator 51 is not limited to a hydraulic cylinder and may be a hydraulic jack or the like. As illustrated in FIG. 3, the second actuator 51 is connected to the hydraulic pump 10 via a second control valve 12. The second control valve 12 is a solenoid valve or the like and extends and contracts the second actuator 51 by adjusting the hydraulic fluid that is to be supplied to the second actuator 51.

As illustrated in FIG. 5 to FIG. 7, the second actuator 51 extends in the front-rear direction and couples the front support portion 40 and the rear support portion 45 to each other. Specifically, the front end (a rod 51*a* of the second actuator 51 in the present preferred embodiment) of the second actuator 51 is coupled to the tilt base 43, and the rear end (a cylinder tube 51*b* of the second actuator 51 in the present preferred embodiment) of the second actuator 51 is coupled to the rear end of the rear support portion 45.

Therefore, when the hydraulic fluid supplied from the hydraulic pump 10 to the second actuator 51 is controlled to extend the second actuator 51 to shift from FIG. 7 to FIG. 6, the distance (fourth distance L4) between the first wheel 22 and the second wheel 23 increases, that is, the tension of the crawler 21 in the front-rear direction increases.

When the hydraulic fluid supplied from the hydraulic pump 10 to the second actuator 51 is controlled to contract the second actuator 51 to shift from FIG. 6 to FIG. 7, the distance (fourth distance L4) between the first wheel 22 and the second wheel 23 decreases, that is, the tension of the crawler 21 in the front-rear direction decreases.

As illustrated in FIG. 4, the cylinder cover 52 is formed of a rectangular member, a plate member, or the like and covers at least a portion of the second actuator 51. In the present preferred embodiment, the cylinder cover 52 covers portions width-direction outward (leftward), forward, and upward of the front end of the second actuator 51. While the crawler traveling device 20 at the rear includes the cylinder cover 52 and the tension cover 44 as separate bodies, a configuration in which, as in the crawler traveling device 20 at the front illustrated in FIG. 1, the tension cover 44 also serves as the cylinder cover or the cylinder cover also serves as the tension cover may be employed.

As illustrated in FIG. 3, the working machine 1 includes a controller 60. The controller 60 controls the vehicle-height changing mechanism 30 and the distance changing mechanism 50 to change the position of the support frame 24 in the vertical direction with respect to the third wheel 25 and change the distance between the first wheel 22 and the second wheel 23. It is thereby possible to change the length of the crawler 21 in the vertical direction while properly maintaining the tension applied to the crawler 21. Consequently, the machine body 2 to which the crawler traveling device 20 is attached can change the vehicle height.

The controller 60 can control each of the first control valve 11 and the second control valve 12 of the working machine 1 independently, that is, can independently control the first actuators 31 and the second actuators 51 of the plurality of crawler traveling devices 20 included in the working machine 1. In other words, each vehicle-height changing mechanism 30 can independently change the position of the support frame 24 in the vertical direction with respect to the third wheel 25.

In addition, the controller 60 can control the vehicle-height changing mechanism 30 and the distance changing mechanism 50 in both of or one of a case in which the crawler traveling device 20 is driven and the working machine 1 travels and a case in which the crawler traveling device 20 is stopped and the working machine 1 stops.

The controller 60 is a device that includes an electric/electronic circuit, a program stored in a CPU or the like, and the like and controls various devices of the working machine 1. For example, the controller 60 can control, in an unmanned or autonomous manner, the rotation speed of the electric motor 4a, and the vehicle speed, steering, and the like of the traveling device 3. The controller 60 may control the rotation speed of the electric motor 4a, and the vehicle speed, steering, and the like of the traveling device 3 in accordance with an operation of an operation device provided at the working machine 1.

As illustrated in FIG. 3, a plurality of detectors 61 are connected to the controller 60. The plurality of detectors 61 are devices that detect a state of the working machine 1. In the present preferred embodiment, the plurality of detectors 61 include a first extension sensor 61a that detects an extension (stroke) of the first actuators 31, and a second extension sensor 61b that detects an extension (stroke) of the second actuators 51. The first extension sensor 61a and the second extension sensor 61b are respectively provided at the first actuator 31 and the second actuator 51 of each of the plurality of crawler traveling devices 20 included in the working machine 1.

The first extension sensor 61a and the second extension sensor 61b each output a detection signal to the controller 60. On the basis of the detection signals output from the first extension sensor 61a and the second extension sensor 61b, the controller 60 can acquire strokes of the first actuator 31 and the second actuator 51, that is, acquire the position of the support frame 24 in the vertical direction with respect to the third wheel 25 and the distance between the first wheel 22 and the second wheel 23.

As illustrated in FIG. 3, the controller 60 has a storage unit 60a that stores a program and a table relating to control. The storage unit 60a is a nonvolatile memory or the like. The controller 60 controls devices on the basis of a signal input from the outside and the program and the table stored in the storage unit 60a. Specifically, for example, the controller 60 acquires a signal transmitted from a terminal such as a personal computer (PC), a smartphone (multifunctional mobile telephone), or a tablet connected to the working machine 1 to be capable of communication with each other, or a server. On the basis of the signal, the table stored in the storage unit 60a, and the detection signals output from the first extension sensor 61a and the second extension sensor 61b, the controller 60 controls the first control valve 11 and the second control valve 12 to control the vehicle-height changing mechanism 30 and the distance changing mechanism 50. Hereinafter, an example in which the controller 60 controls the first control valve 11 and the second control valve 12 on the basis of a signal output from a terminal to control the vehicle-height changing mechanism 30 and the distance changing mechanism 50 and thereby changes the vehicle height of the machine body 2 will be described.

The terminal is an operable device that has a display portion including any one of a liquid crystal panel, a touch panel, and the other panels. The terminal displays a predetermined setting screen on the display portion, accepts an input of a vehicle height (setting vehicle height) of the machine body 2, and outputs the setting vehicle height as a signal (setting signal) to the controller 60. In detail, on the setting screen, a vehicle height at each position of the plurality of crawler traveling devices 20 can be set independently.

In the present preferred embodiment, an example in which the terminal outputs the setting signal to the controller 60 will be described. The method of operating control of the vehicle height by the controller 60 is, however, not limited to the aforementioned method. The terminal may be capable of receiving operations of raising and lowering the vehicle height and may output a signal (raising signal) for raising the vehicle height and a signal (lowering signal) for lowering the vehicle height to the controller 60, and the controller 60 may change the vehicle height of the machine body 2 on the basis of the raising signal and the lowering signal. The working machine 1 may include a position detector that detects the position of the working machine 1, and the controller 60 may change the vehicle height on the basis of the position detected by the position detector and position information stored in the storage unit 60a. When the working machine 1 is provided with an operation device that operates the working machine 1, the controller 60 may change the vehicle height on the basis of an operation signal output from the operation device.

Hereinafter, control of the vehicle-height changing mechanism 30 and the distance changing mechanism 50 by the controller 60 will be described. When the controller 60 acquires a setting signal from the terminal, the controller 60 acquires a setting vehicle height on the basis of the setting signal and the table in the storage unit 60a. When acquired the setting vehicle height, the controller 60 acquires a detection signal from the first extension sensor 61a and acquires the position of the support frame 24 in the vertical direction with respect to the third wheel 25, in other words, a current vehicle height (actual vehicle height) of the vehicle body.

When acquired the actual vehicle height, the controller 60 compares the setting vehicle height with the actual vehicle height. When the setting vehicle height is higher than the actual vehicle height, the controller 60 controls the first control valve 11 to control the hydraulic fluid supplied from the hydraulic pump 10 to the first actuator 31 and extends the first actuator 31. That is, the position of the support frame 24 in the vertical direction with respect to the third wheel 25 moves downward to shift from FIG. 6 to FIG. 7, and the distance (first distance L1) from the third wheel 25 to the support frame 24 increases. Consequently, the distance (second distance L2) between the axis of the third spindle 25a and the ground contact surface of the crawler 21 increases, and the distance (third distance L3) between the upper end of the crawler 21 and the ground contact surface of the crawler 21 increases.

The controller 60 controls the second control valve 12 on the basis of the setting signal, the table in the storage unit 60a, and the detection signal output from the second extension sensor 61b to control the hydraulic fluid supplied from the hydraulic pump 10 to the second actuator 51 and contracts the second actuator 51. That is, the distance (fourth distance L4) between the first wheel 22 and the second wheel 23 decreases to shift from FIG. 6 to FIG. 7. Thus, the distance (fifth distance L5) between the first spindle 22*a* and the second spindle 23*a* decreases, and the distance (sixth distance L6) between the front end of the crawler 21 and the rear end of the crawler 21 decreases. Consequently, it is possible to increase the length of the crawler 21 in the vertical direction, that is, raise the vehicle height and possible to maintain the tension of the crawler 21 at a certain level or more and avoid excessive tension from being applied to the crawler 21.

When the setting vehicle height is lower than the actual vehicle height, the controller 60 controls the first control valve 11 to control the hydraulic fluid supplied from the hydraulic pump 10 to the first actuator 31 and contracts the first actuator 31. That is, the position of the support frame 24 in the vertical direction with respect to the third wheel 25 moves upward to shift from FIG. 7 to FIG. 6, and the distance (first distance L1) from the third wheel 25 to the support frame 24 decreases. Thus, the distance (second distance L2) between the axis of third spindle 25*a* and the ground contact surface of the crawler 21 decreases, and the distance (third distance L3) between the upper end of the crawler 21 and the ground contact surface of the crawler 21 decreases.

The controller 60 controls the second control valve 12 on the basis of the setting signal, the table in the storage unit 60*a*, and the detection signal output from the second extension sensor 61*b* to control the hydraulic fluid supplied from the hydraulic pump 10 to the second actuator 51 and extends the second actuator 51. That is, the distance (fourth distance L4) between the first wheel 22 and the second wheel 23 increases to shift from FIG. 7 to FIG. 6. Thus, the distance (fifth distance L5) between the first spindle 22*a* and the second spindle 23*a* increases, and the distance (sixth distance L6) between the front end of the crawler 21 and the rear end of the crawler 21 increases. Consequently, it is possible to decrease the length of the crawler 21 in the vertical direction, that is, lower the vehicle height and possible to maintain the tension of the crawler 21 at a certain level or more and avoid the crawler 21 from coming off.

In other words, when the first actuators 31 of the vehicle-height changing mechanisms 30 at the front and rear of the machine body 2 are extended to increase the length of the crawler 21 in the vertical direction, the vehicle height can be raised while the machine body 2 is maintained to be horizontal to the ground. When the first actuators 31 of the vehicle-height changing mechanisms 30 at the front and rear of the machine body 2 are contracted to decrease the length of the crawler 21 in the vertical direction, the vehicle height can be lowered while the machine body 2 is maintained to be horizontal to the ground.

When the first actuator 31 of the vehicle-height changing mechanism 30 at the front of the machine body 2 is contracted to decrease the length of the crawler 21 in the vertical direction and when the first actuator 31 of the vehicle-height changing mechanism 30 at the rear of the machine body 2 is extended to increase the length of the crawler 21 in the vertical direction, it is possible to cause the machine body 2 to be in an orientation tilted forward with respect to the ground by decreasing the vehicle height of a front part of the machine body 2 to be lower than the vehicle height of a rear part of the machine body 2. When the first actuator 31 of the vehicle-height changing mechanism 30 at the front of the machine body 2 is extended to increase the length of the crawler 21 in the vertical direction and when the first actuator 31 of the vehicle-height changing mechanism 30 at the rear of the machine body 2 is contracted to decrease the length of the crawler 21 in the vertical direction, it is possible to cause the machine body 2 to be in an orientation tilted rearward with respect to the ground by decreasing the vehicle height of the rear part of the machine body 2 to be lower than the vehicle height of the front part of the machine body 2.

When the first actuator 31 of the vehicle-height changing mechanism 30 at the left of the machine body 2 is contracted to decrease the length of the crawler 21 in the vertical direction and when the first actuator 31 of the vehicle-height changing mechanism 30 at the right of the machine body 2 is extended to increase the length of the crawler 21 in the vertical direction, it is possible to cause the machine body 2 to be in an orientation tilted leftward with respect to the ground by decreasing the vehicle height of a left portion of the machine body 2 to be lower than the vehicle height of a right portion of the machine body 2. When the first actuator 31 of the vehicle-height changing mechanism 30 at the left of the machine body 2 is extended to increase the length of the crawler 21 in the vertical direction and when the first actuator 31 of the vehicle-height changing mechanism 30 at the right of the machine body 2 is contracted to decrease the length of the crawler 21 in the vertical direction, it is possible to cause the machine body 2 to be in an orientation tilted rightward with respect to the ground by decreasing the vehicle height of the right portion of the machine body 2 to be lower than the vehicle height of the left portion of the machine body 2.

Hereinafter, the battery unit 5 and charging of the battery unit 5 will be described. The battery unit 5 is a structure body that can store electric power and that outputs stored electric power. The battery unit 5 has a battery 5*a* in the inside of a housing (case). The battery 5*a* can store electric power and is, for example, a secondary battery, such as a lithium ion battery, a lead storage battery, or the like. The battery 5*a* has a plurality of cells in the inside thereof. The plurality of cells are electrically connected in series and in parallel. The battery unit 5 is connected to a charger 15 provided at the working machine 1. The charger 15 includes a socket 15*a* to which a cable for charging the battery unit 5 is connected, a power supply portion 15*b* for so-called contactless charging that obtains electric power with power output from the outside, and the like. The power supply portion 15*b* includes a power-reception antenna coil, a power regeneration circuit that regenerates electric power from current generated in the power-reception antenna coil, a booster circuit, and the like.

As illustrated in FIG. 1, the power supply portion 15*b* (power-reception antenna coil) is provided at, for example, a lower portion of the machine body 2 and generates current by a magnetic force output from a power-transmission antenna coil of an external portion (charging station). The power-transmission antenna coil is installed, for example, on the ground. The working machine 1 moves to the charging station so that the power-reception antenna coil is positioned above the power-transmission antenna coil, and changes the vehicle height by controlling the crawler traveling device 20 to cause a distance between the power-reception antenna coil and the power-transmission antenna coil to be within a predetermined range. Therefore, the battery unit 5 can be charged by being supplied with electric power from an external portion via the charger 15 that includes the power supply portion 15*b*.

As illustrated in FIG. 3, the charger 15 may include a solar panel 15*c*, in addition to the socket 15*a*, the power supply portion 15b, and the like. The solar panel 15c can convert optical energy into electric energy (electric power) and output the electric energy. For example, as illustrated in FIG. 1 and FIG. 2, the solar panel 15c is disposed to stretch from the front end to the rear end of the upper wall 7d of the exterior body 7. Consequently, the battery unit 5 can be charged by electric power output from the solar panel 15c, instead of or in addition to electric power output from the socket 15a and the power supply portion 15b.

As illustrated in FIG. 1 and FIG. 3, the working machine 1 includes at least one charging display portion 70, and the controller 60 controls display on the charging display portion 70 on the basis of the state of the battery 5a. Specifically, the controller 60 acquires information on charging of the battery 5a from a state detector, which is the detector 61 provided at the working machine 1. The state detector includes an electric/electronic circuit, a program, and the like and can detect a state relating to charging of the battery 5a. In the present preferred embodiment, the state detector is a BMU (battery management unit) 5a1 that is provided, for example, at the battery 5a and that monitors/controls battery 5a.

The BMU 5a1 acquires the voltage, the temperature, and the current of the battery 5a, and the terminal voltage and the like of the cells in the inside and calculates the remaining capacity of the battery 5a. For example, the BMU 5a1 detects the remaining capacity of the battery 5a by using the terminal voltage of the cells in the inside of the battery 5a and a voltage measurement method. The method of detecting the remaining capacity of the battery 5a is not limited to the voltage measurement method and may be a method such as a coulomb counter method, a battery-cell modeling method, an impedance track method, or the like.

The BMU 5a1 can control opening/closing of a relay in the inside of the battery 5a and can control start and stop of power supply of the battery 5a, in other words, can obtain information whether the battery 5a is in a charging state or a discharging state in which charging is not performed. Thus, the BMU 5a1 outputs to the controller 60 information that includes the remaining capacity of the battery 5a and whether the battery 5a is in the charging state or the discharging state. The state detector is not limited to the BMU 5a1 as long as being capable of detecting a state relating to charging of the battery 5a.

The charging display portion 70 can display information on charging of the battery 5a in accordance with control by the controller 60. The charging display portion 70 is connected to the controller 60 and changes the form of display on the basis of a signal output from the controller 60. Specifically, the charging display portion 70 can display the remaining capacity of the battery 5a and display the charging state and the discharging state of the battery 5a by varying the form of display.

The charging display portion 70 is provided at, for example, the exterior body 7 of the working machine 1 and reports a state of the battery 5a to the outside. In the present preferred embodiment, as illustrated in FIG. 1, the charging display portion 70 is disposed outward of each of a pair of the side walls 7c of the exterior body 7. Specifically, the charging display portion 70 is disposed at an intermediate portion in the vertical direction between the crawler traveling device 20 at the front and the crawler traveling device 20 at the rear. This enables an operator to visually recognize the charging display portions 70 by looking at the side walls 7c. The charging display portion 70 may be disposed at, in addition to or instead of the side walls 7c, a different part (for example, the front wall 7a, the rear wall 7b, or the like) of the exterior body 7.

Figure 8:
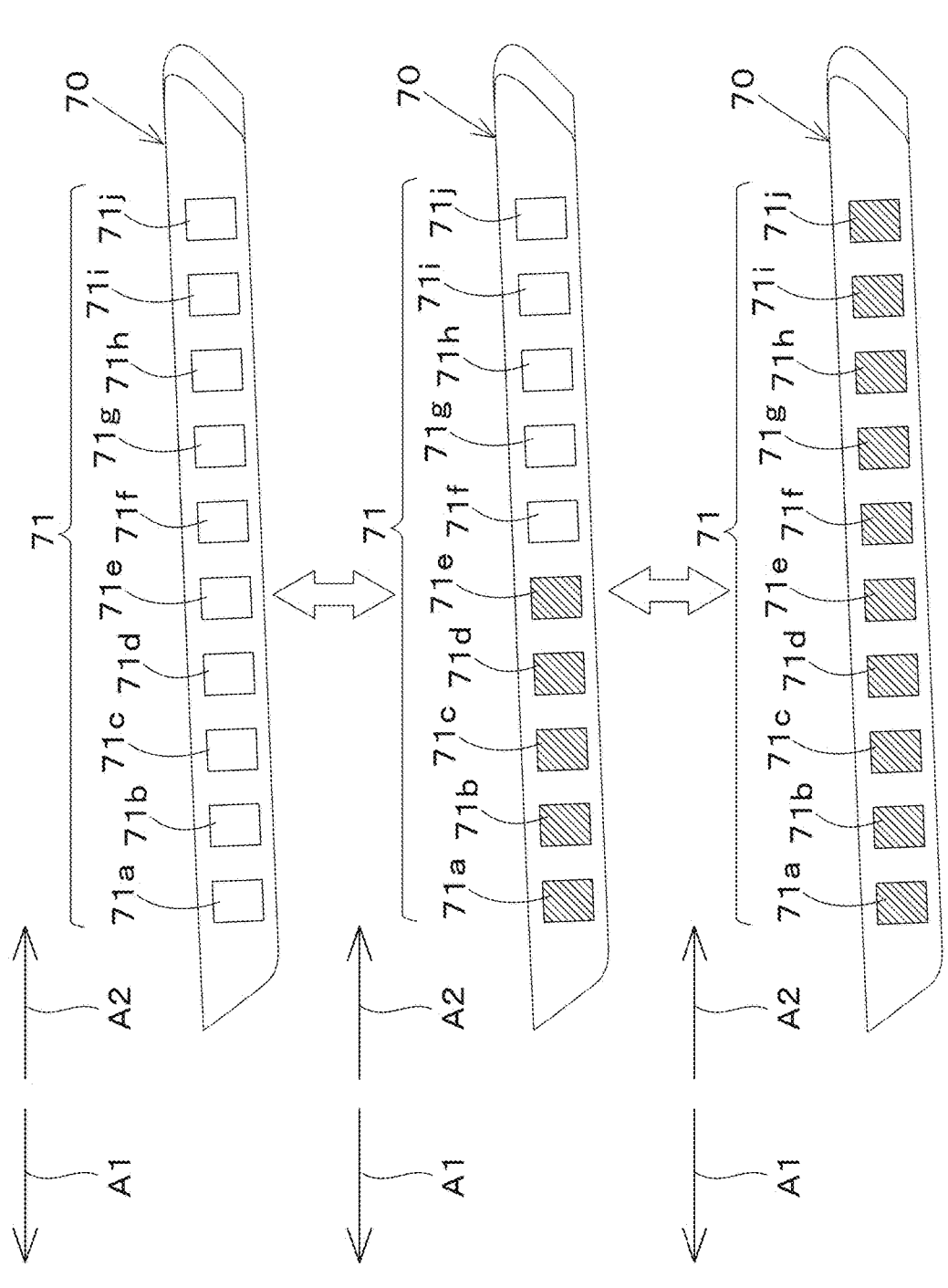
FIG. 8 is a diagram describing a transition of a display form of a charging display portion in the first preferred embodiment of the present invention.

As illustrated in FIG. 1, the charging display portion 70 is a rod-shaped indicator (level gauge) extending in the front-rear direction and can display the remaining capacity of the battery 5a in a level-wise manner. In the present preferred embodiment, the charging display portion 70 includes a plurality of LED light sources 71 disposed to form a row in a predetermined direction. The LED light sources 71 can be turned on in, for example, blue or green. The charging display portion 70 varies the form of display by turning on or off the LED light sources 71 on the basis of a signal output from the controller 60. As illustrated in FIG. 8, the plurality of LED light sources 71 include, for example, ten light sources in total including, in order from the front, a first light source 71a, a second light source 71b, a third light source 71c, a fourth light source 71d, a fifth light source 71e, a sixth light source 71f, a seventh light source 71g, an eighth light source 71h, a ninth light source 71i, and a tenth light source 71j. The number of the light sources of the plurality of LED light sources 71 is not limited to ten and can be changed, as appropriate.

The first light source 71a indicates that the remaining capacity of the battery 5a is at the smallest level. When the remaining capacity of the battery 5a is less than a predetermined value (for example, 10%), the controller 60 turns off the first light source 71a. When the remaining capacity of the battery 5a is more than or equal to 10%, the controller 60 turns on the first light source 71a. The tenth light source 71j indicates that the remaining capacity of the battery 5a is at the largest level. When the remaining capacity of the battery 5a is less than a predetermined value (for example, 90%), the controller 60 turns off the tenth light source 71j. When the remaining capacity of the battery 5a is more than or equal to 90%, the controller 60 turns on the tenth light source 71j. The second light source 71b to the ninth light source 71i each indicate that the remaining capacity of the battery 5a is at a level between the smallest level (less than 10%) and the largest level (more than or equal to 90%). The controller 60 turns off each of the second light source 71b to the ninth light source 71i when the remaining capacity of the battery 5a is less than a predetermined level. The controller 60 turns on each of the second light source 71b to the ninth light source 71i when the remaining capacity of the battery 5a is more than or equal to the predetermined level.

That is, when the remaining capacity of the battery 5a detected by the BMU 5a1 is zero, the controller 60 turns off all of the plurality of LED light sources 71, as illustrated in FIG. 8. When the remaining capacity of the battery 5a is half (the remaining capacity is more than or equal to 40% and less than 50%), among the plurality of LED light sources 71, the first light source 71a to the fifth light source 71e are turned on and the sixth light source 71f to the tenth light source 71j are turned off as illustrated in an intermediate diagram of FIG. 8. When the remaining capacity of the battery 5a is sufficient (the remaining capacity is more than or equal to 90%), all of the plurality of LED light sources 71 are turned on as illustrated in a lower diagram of FIG. 8.

Differently from when the battery 5a is in the discharging state, when the battery 5a is in the charging state, the controller 60 repeatedly turns on and off (blink), at predetermined time intervals, the LED light sources 71 that are turned on on the basis of the remaining capacity of the battery 5a in the charging state. Specifically, the controller 60 gently switches the LED light sources 71 between on and off.

The charging display portion 70 is not limited to the plurality of LED light sources 71 as long as the charging display portion 70 can display information on charging of the battery 5a in accordance with control by the controller 60. The charging display portion 70 may be, for example, a display screen that can display various types of information. The plurality of LED light sources 71 may switch colors to thereby change the form of display. The configuration, the display method, the position of the charging display portion 70 are not limited to the configurations described above.

For example, as illustrated in FIG. 1 and FIG. 2, an example in which the working machine 1 has a direction indicator (winker) 16 and in which the direction indicator 16 also serving as the charging display portion 70 will be described. The controller 60 may be configured to turn on the direction indicator 16 in green when the battery 5a is in the charging state, turn on the direction indicator 16 in blue when the battery 5a is in the discharging state and when the remaining capacity of the battery 5a is more than or equal to a predetermined level, and turn on the direction indicator 16 in red when the battery 5a is in the discharging state and when the remaining capacity of the battery 5a is less than the predetermined level.

Differently from when the battery 5a is in the discharging state, when the battery 5a is in the charging state, the controller 60 may cause the first light source 71a to the tenth light source 71j to blink flowingly in the order from the first light source 71a to the tenth light source 71j (or the reverse order).

The crawler traveling device 20 described above includes the first wheel 22; the second wheel 23 spaced from the first wheel 22; the support frame 24 that supports the first wheel 22 and the second wheel 23; the third wheel 25 disposed above the support frame 24; the endless crawler 21 wound around the first wheel 22, the second wheel 23, and the third wheel 25; and the vehicle-height changing mechanism 30 that changes the position of the support frame 24 in the vertical direction with respect to the third wheel 25. According to the aforementioned configuration, the crawler traveling device 20 can change the length of the crawler 21 in the vertical direction by changing the position of the support frame 24 in the vertical direction with respect to the third wheel 25. It is thus possible to change the vehicle height of the working machine 1 or the like provided with the crawler traveling device 20 and possible to improve traveling performance and working performance by adjusting the positional relationship with the ground.

The vehicle-height changing mechanism 30 has the actuator 31 that is capable of contracting in the vertical direction and that changes the position of the support frame 24 in the vertical direction with respect to the third wheel 25. According to the configuration described above, a vehicle-height change by the crawler traveling device 20 can be easily achieved.

The first wheel 22 and the second wheel 23 are driven wheels that apply tension to the crawler 21, and the third wheel 25 is a driving wheel that is rotatably driven by power transmitted thereto. According to the aforementioned configuration, the first wheel 22 and the second wheel 23 are grounded via the crawler 21, and the third wheel 25 is not grounded. It is thus possible by disposing the third wheel 25, which is a driving wheel to be driven, to be apart from the ground to suppress the third wheel 25 from being damaged by an obstacle such as a stone or the like and from being deteriorated by dust or dirt.

The crawler traveling device 20 includes the distance changing mechanism 50 that is provided at the support frame 24 and that changes the distance between the first wheel 22 and the second wheel 23. According to the aforementioned configuration, it is possible to adjust the tension of the crawler 21 changed by changing the position of the support frame 24 in the vertical direction with respect to the third wheel 25 by the vehicle-height changing mechanism 30. It is thus possible to maintain the tension of the crawler 21 at a certain level or more and avoid the crawler 21 from coming off. It is also possible to avoid excessive tension from being applied to the crawler 21.

The crawler traveling device 20 includes the plurality of rollers 26 that are attached to the support frame 24 and spaced from each other. The distance between, among the plurality of rollers 26, the roller 26 adjacent to the first wheel 22 and the first wheel 22 is longer than the distance between the roller 26 adjacent to the second wheel 23 and the second wheel 23. According to the aforementioned configuration, the distance changing mechanism 50 can change at least the distance between the roller 26 adjacent to the first wheel 22 and the first wheel 22. It is thus possible to achieve an improvement in the ground contact pressure of the crawler 21 applied by the rollers 26 and suppression of coming-off of the crawler 21 while achieving adjustment of the tension of the crawler 21.

The working machine 1 includes the plurality of crawler traveling devices 20 and the machine body 2 that has the mount portion 8 on which a working device is mountable. The plurality of crawler traveling devices 20 include the pair of crawler traveling devices 20 that are spaced from each other in the width direction of the machine body 2 and that are provided at a front portion of the machine body 2, and the pair of crawler traveling devices 20 that are spaced from each other in the width direction and that are provided at a rear portion of the machine body 2. According to the aforementioned configuration, it is possible to support the machine body 2 stably by providing a front portion of the machine body 2 with a pair of the crawler traveling devices 20 that can change the vehicle height of the machine body 2 and providing a rear portion of the machine body 2 with a pair of the crawler traveling devices 20, and possible by changing the vehicle height to avoid the lower surface of the machine body 2 from coming into contact with a step of a ridge or the like or a relatively large obstacle and possible to climb over the ridge or the obstacle easily.

Each vehicle-height changing mechanism 30 independently changes the position of the support frame 24 in the vertical direction with respect to the third wheel 25. According to the aforementioned configuration, it is possible to change the vehicle height to be higher at a part or change the vehicle height to be lower at the other part by independently changing the position of the support frame 24 in the vertical direction with respect to the third wheel 25. It is thus possible to easily maintain, regardless of the state of the ground, a state in which the working machine 1 is horizontal to the ground and possible to flexibly change the orientation of the machine body 2. It is also possible to properly maintain the ground contact pressure of the crawler 21 and possible to cause the working machine 1 to travel stably.

Second Preferred Embodiment

Figure 9:
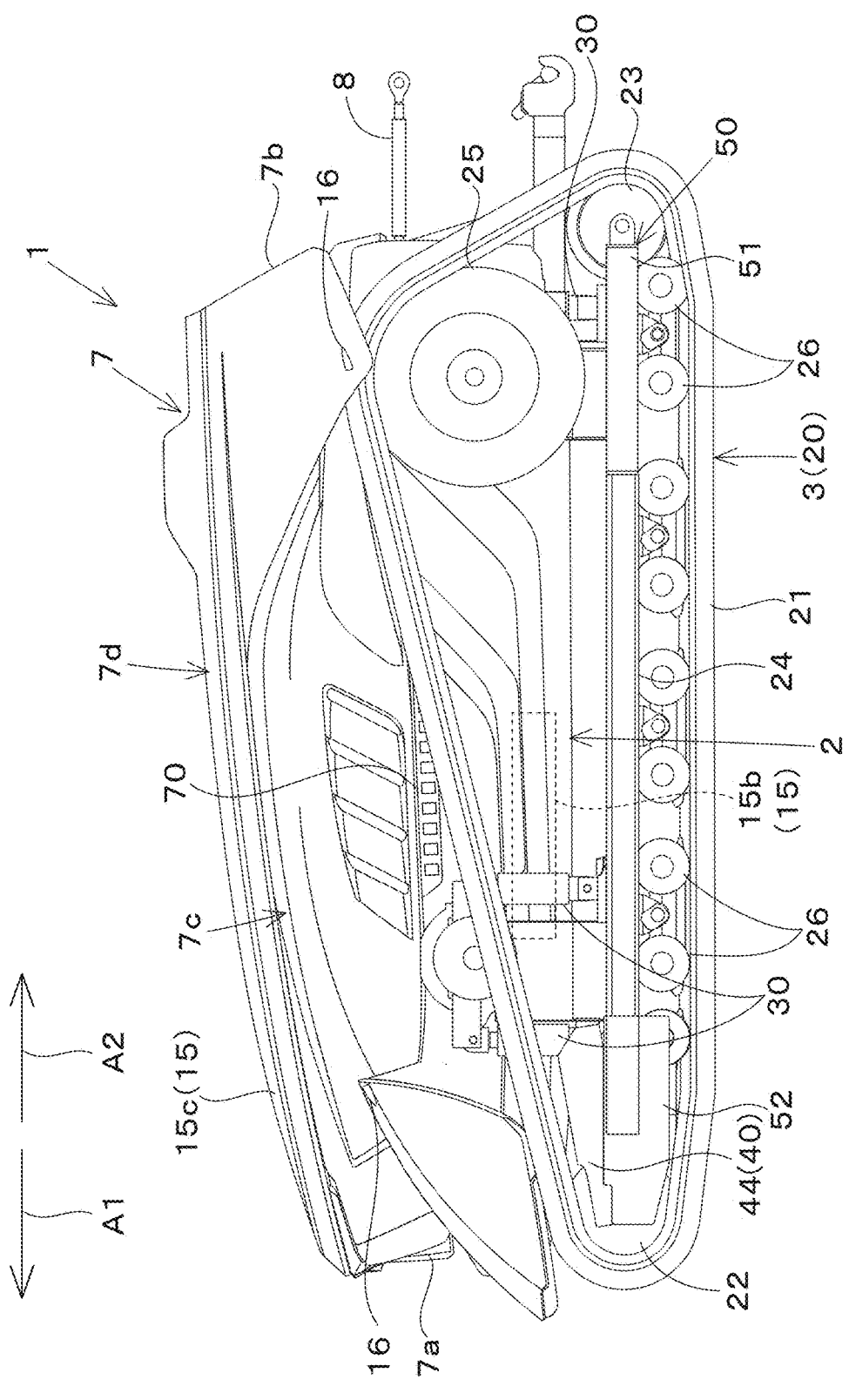
FIG. 9 is a schematic side view illustrating a working machine in a second preferred embodiment of the present invention.
Figure 10:
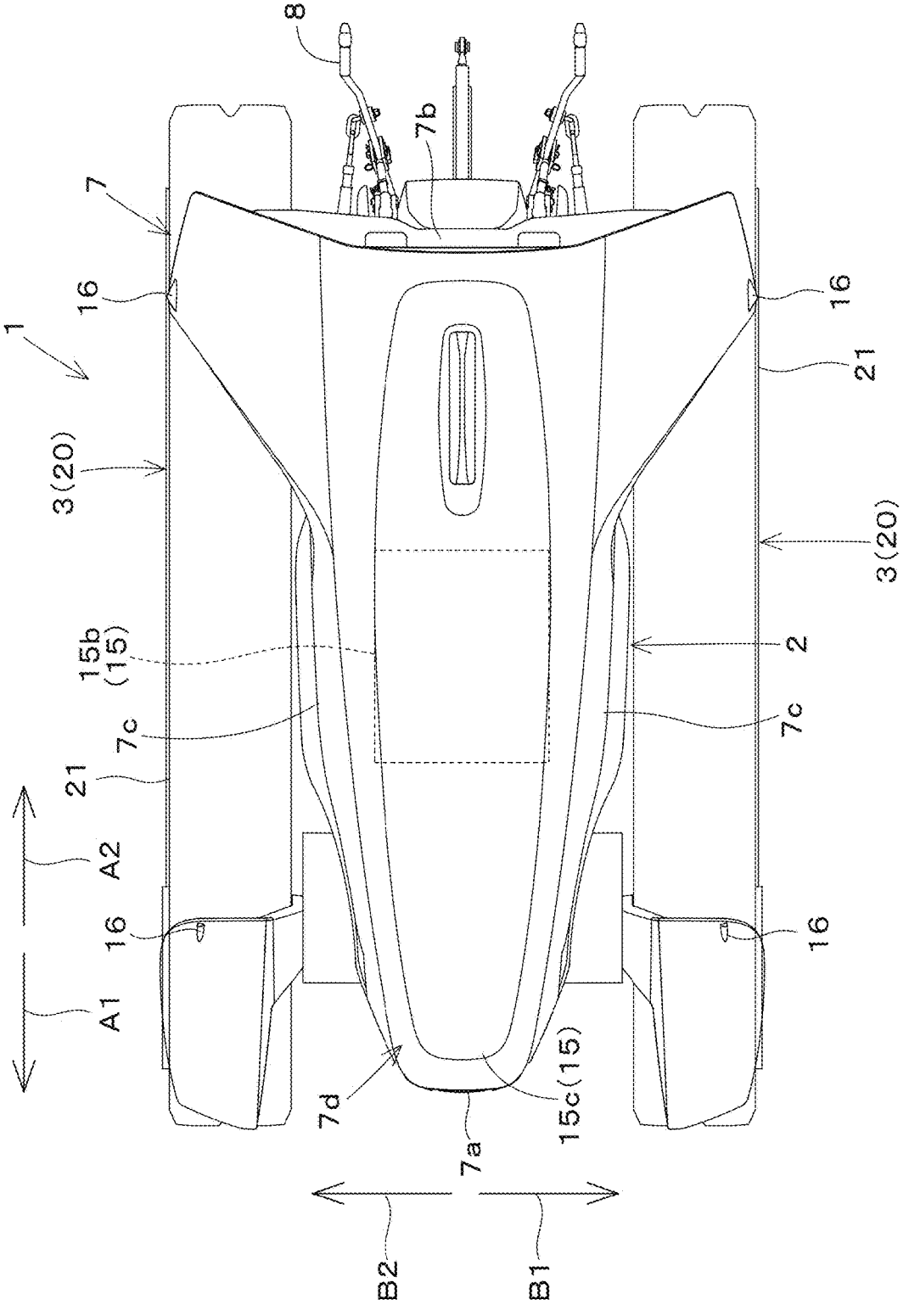
FIG. 10 is a schematic plan view illustrating the working machine in the second preferred embodiment of the present invention.

FIG. 9 and FIG. 10 illustrate another preferred embodiment (second preferred embodiment) of the working machine 1. Hereinafter, regarding the working machine 1 in the second preferred embodiment, components that differ from those in the above-described preferred embodiment (first preferred embodiment) will be mainly described. As for components common to those in the first preferred embodiment, detailed description is omitted by giving the same reference signs thereto. As illustrated in FIG. 9 and FIG. 10, the plurality of crawler traveling devices 20 of the working machine 1 include the crawler traveling device 20 provided on one side (left side) in the width direction of the machine body 2 and the crawler traveling device 20 provided on the other side (right side) in the width direction in the second preferred embodiment. That is, a pair of the crawler traveling devices 20 are disposed in the width direction. The crawler 21 is disposed to stretch from the front end to the rear end of the machine body 2, and the first wheel 22 is positioned at a front portion of the machine body 2. The second wheel 23 is positioned at a rear portion of the machine body 2.

In such a case, when the first actuators 31 of the vehicle-height changing mechanisms 30 at the left and right of the machine body 2 are extended to increase the length of the crawler 21 in the vertical direction, the vehicle height can be raised while maintaining the machine body 2 to be horizontal to the ground. When the first actuators 31 of the vehicle-height changing mechanisms 30 at the left and right of the machine body 2 are contracted to decrease the length of the crawler 21 in the vertical direction, the vehicle height can be lowered while maintaining the machine body 2 to be horizontal to the ground.

When the first actuator 31 of the vehicle-height changing mechanism 30 at the left of the machine body 2 is contracted to decrease the length of the crawler 21 in the vertical direction and when the first actuator 31 of the vehicle-height changing mechanism 30 at the right of the machine body 2 is extended to increase the length of the crawler 21 in the vertical direction, it is possible to cause the machine body 2 to be in an orientation tilted leftward with respect to the ground by decreasing the vehicle height of a left portion of the machine body 2 to be lower than the vehicle height of a right portion of the machine body 2. When the first actuator 31 of the vehicle-height changing mechanism 30 at the left of the machine body 2 is extended to increase the length of the crawler 21 in the vertical direction and when the first actuator 31 of the vehicle-height changing mechanism 30 at the right of the machine body 2 is contracted to decrease the length of the crawler 21 in the vertical direction, it is possible to cause the machine body 2 to be in an orientation tilted rightward with respect to the ground by decreasing the vehicle height of the right portion of the machine body 2 to be lower than the vehicle height of the left portion of the machine body 2.

In the preferred embodiment described above, the crawler 21 is disposed to stretch from the front end to the rear end of the machine body 2, the first wheel 22 is positioned at the front portion of the machine body 2, and the second wheel 23 is positioned at the rear portion of the machine body 2. However, a pair of the crawler traveling devices 20 may be disposed in the width direction at one of the front portion and the rear portion of the machine body 2 as long as the pair of the crawler traveling devices 20 are disposed in the width direction. Further, the other one of the front portion and the rear portion of the machine body 2 may be provided with the traveling device 3 having a configuration and a structure that differ from those of the crawler traveling devices 20.

Figure 11:
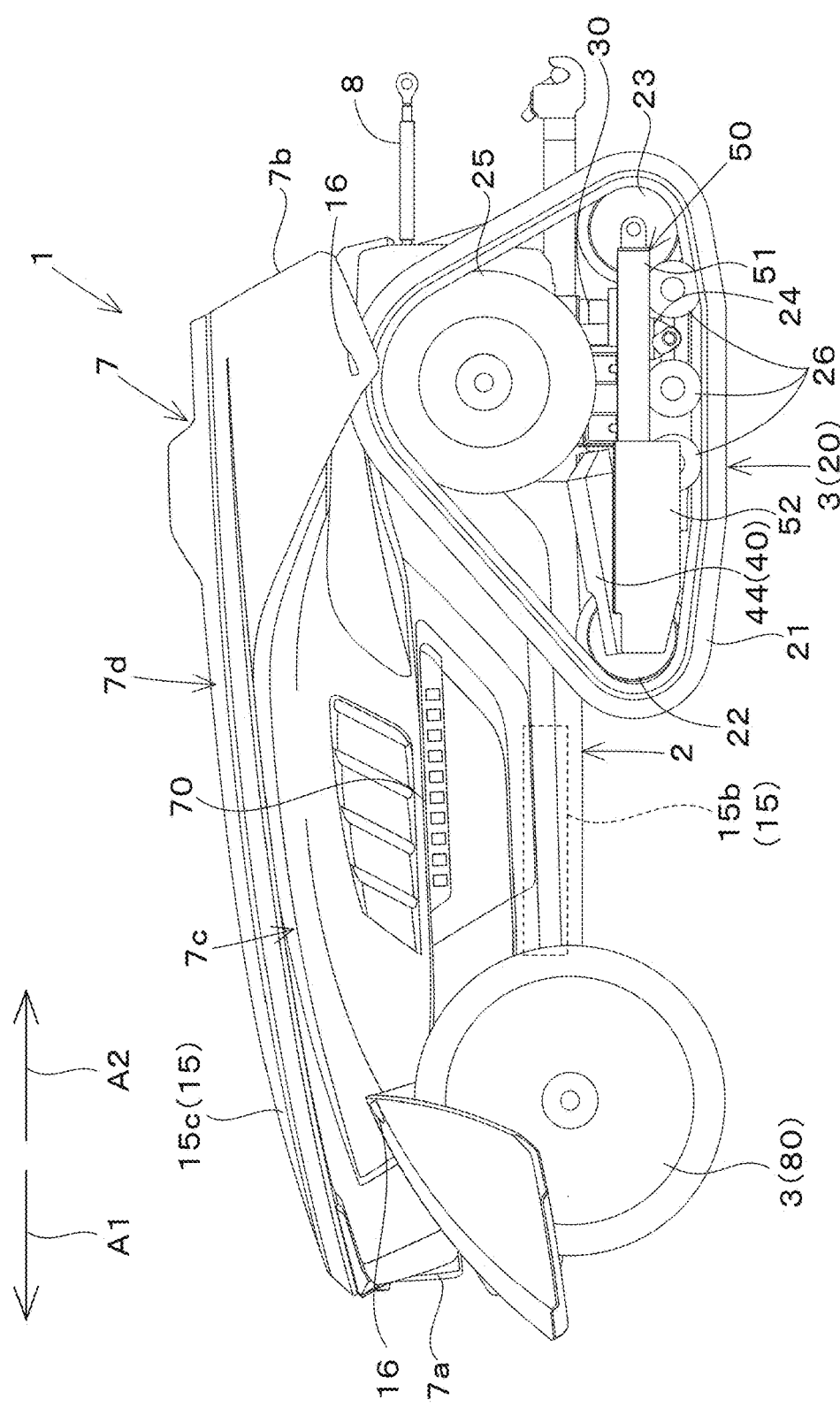
FIG. 11 is a schematic side view illustrating a modification of the working machine in the second preferred embodiment of the present invention.
Figure 12:
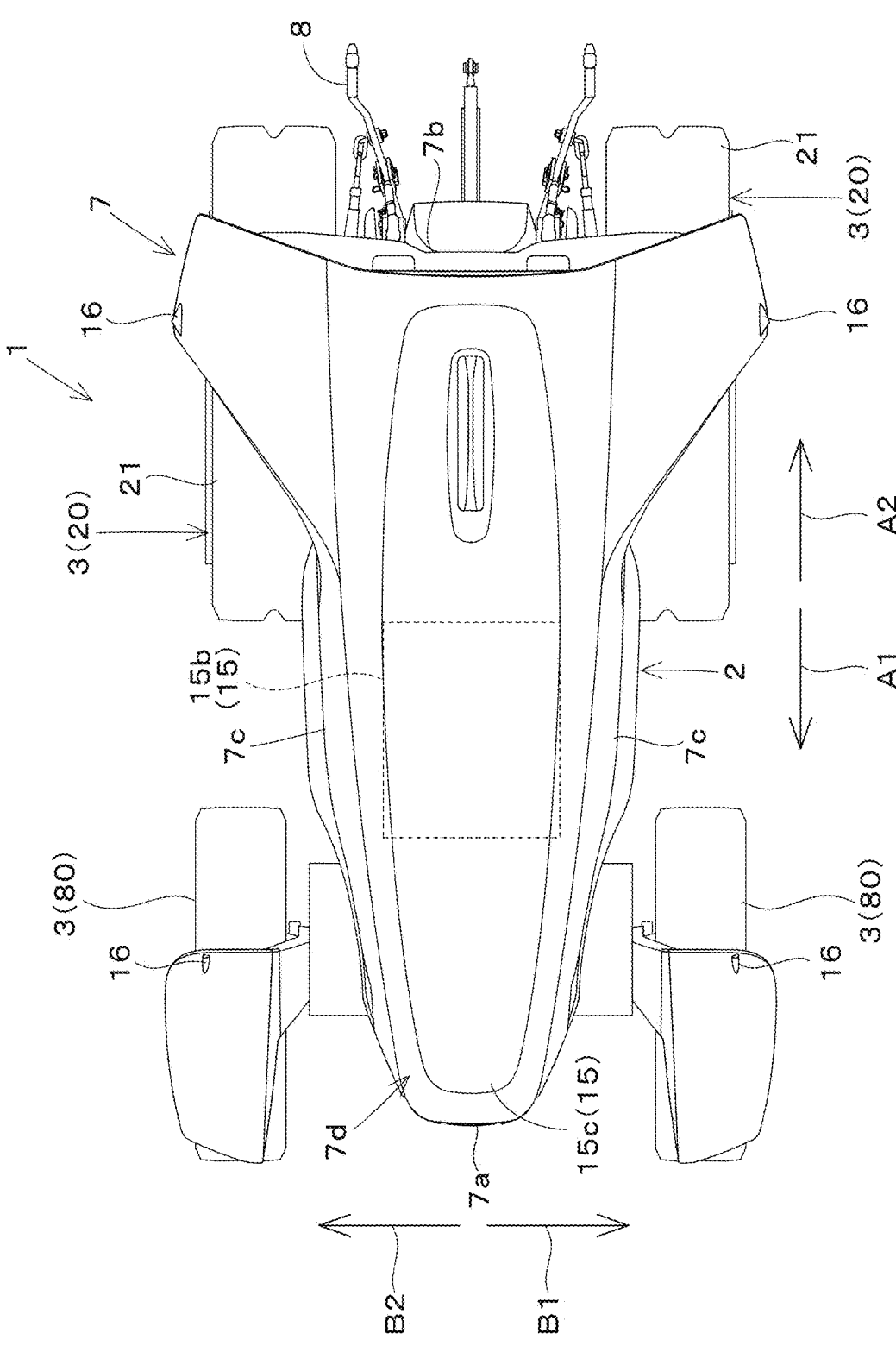
FIG. 12 is a schematic plan view illustrating the modification of the working machine in the second preferred embodiment of the present invention.

Specifically, for example, as illustrated in FIG. 11 and FIG. 12, a rear portion of the machine body 2 may be provided with the crawler traveling devices 20, and a front portion of the machine body 2 may be provided with a pair of wheels 80 that are apart from each other in the width direction. As illustrated in FIG. 11, each of the wheels 80 is of a tire type that has a wheel and a tire assembled to the wheel but may be, as the traveling device 3 that differs from the crawler traveling devices 20, the traveling device 3 of the crawler 21 type that does not have the vehicle-height changing mechanism 30.

In such a case, when the first actuators 31 of the vehicle-height changing mechanisms 30 at the left and right of the machine body 2 are extended to increase the length of the crawler 21 in the vertical direction, it is possible to cause the machine body 2 to be in an orientation tilted forward with respect to the ground by decreasing the vehicle height of the front part of the machine body 2 to be lower than the vehicle height of the rear part of the machine body 2. When the first actuators 31 of the vehicle-height changing mechanisms 30 at the left and right of the machine body 2 are contracted to decrease the length of the crawler 21 in the vertical direction, it is possible to cause the machine body 2 to be in an orientation tilted rearward with respect to the ground by decreasing the vehicle height of the rear part of the machine body 2 to be lower than the vehicle height of the front part of the machine body 2.

The working machine 1 described above includes the plurality of crawler traveling devices 20 and the machine body 2 that has the mount portion 8 on which a working device is mountable. The plurality of crawler traveling devices 20 include the crawler traveling device 20 provided on one side in the width direction of the machine body 2 and the crawler traveling device 20 provided on the other side in the width direction. According to the aforementioned configuration, it is possible to support the machine body 2 stably in the width direction by providing the machine body 2 with a pair of the crawler traveling devices 20 that can change the vehicle height of the machine body 2, and possible by changing the vehicle height to avoid the lower surface of the machine body 2 from coming into contact with a step of a ridge or the like or a relatively large obstacle and possible to climb over the ridge or the obstacle easily.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A crawler traveling device comprising:
a first wheel;
a second wheel that is spaced from the first wheel;
a support frame that supports the first wheel and the second wheel with respect to a machine body;
a third wheel that is disposed above the support frame;
an endless crawler that is wound around the first wheel, the second wheel, and the third wheel;
a vehicle-height changing mechanism that changes a position of the support frame in a vertical direction with respect to the third wheel; and
a distance changing mechanism that is provided at the support frame and that changes a distance between the first wheel and the second wheel, wherein
the vehicle-height changing mechanism includes a pair of first actuators that are disposed at a front and a rear of a spindle of the third wheel, that contract in the vertical direction, and that change the position of the support frame in the vertical direction with respect to the third wheel;
the pair of first actuators at the front and the rear of the spindle are offset in a width direction of the machine body;

the support frame has a front support portion to support the first wheel and a rear support portion to support the second wheel;

the distance changing mechanism includes a second actuator that couples the front support portion and the rear support portion and that contracts the support frame in a front-rear direction of the machine body; and one of the pair of first actuators that is at the front of the spindle is offset from the front support portion in the width direction, and overlaps the front support portion in a side view of the machine body when the second actuator is fully contracted.

2. The crawler traveling device according to claim 1, wherein each of the pair of first actuators is a hydraulic cylinder that is driven to extend and contract by a hydraulic fluid delivered by a hydraulic pump.

3. The crawler traveling device according to claim 2, further comprising:

a mount frame that supports the third wheel, wherein each of the pair of first actuators extends in the vertical direction and couples the support frame and the mount frame to each other, and wherein the pair of first actuators changes a distance between the support frame and the mount frame to change the position of the support frame in the vertical direction with respect to the third wheel.

4. The crawler traveling device according to claim 1, wherein the first wheel and the second wheel are driven wheels that apply tension to the crawler, and wherein the third wheel is a driving wheel that is rotatably driven by power transmitted thereto.

5. The crawler traveling device according to claim 4, further comprising:

a plurality of rollers that are attached to the support frame and that are spaced from each other, wherein a distance between, among the plurality of rollers, the roller adjacent to the first wheel and the first wheel is longer than a distance between the roller adjacent to the second wheel and the second wheel.

6. The crawler traveling device according to claim 1, wherein the second actuator is a hydraulic cylinder that is driven to extend and contract by a hydraulic fluid delivered by a hydraulic pump.

7. A working machine comprising:

a plurality of the crawler traveling devices according to claim 1; and a machine body that has a mount portion on which a working device is mountable, wherein the plurality of crawler traveling devices include a crawler traveling device that is provided on one side in a width direction of the machine body and a crawler traveling device that is provided on another side in the width direction.

8. The working machine according to claim 7, comprising:

a battery that stores electric power; and a charging display to display information on charging of the battery, wherein the machine body has an exterior body that houses equipment and/or a device provided at the machine body, and wherein the charging display is provided at a side wall of the exterior body that has a plate surface facing in the width direction of the machine body and reports a state of the battery from the side wall outward in the width direction of the machine body.

9. The working machine according to claim 7, wherein each vehicle-height changing mechanism independently changes a position of the support frame in the vertical direction with respect to the third wheel.

10. A working machine comprising:

a plurality of the crawler traveling devices according to claim 1; and a machine body that has a mount portion on which a working device is mountable, wherein the plurality of crawler traveling devices include a pair of crawler traveling devices that are spaced from each other in a width direction of the machine body and that are provided at a front portion of the machine body, and a pair of crawler traveling devices that are spaced from each other in the width direction and that are provided at a rear portion of the machine body.

11. The working machine according to claim 10, comprising:

a battery that stores electric power; and a charging display to display information on charging of the battery, wherein the machine body has an exterior body that houses equipment and/or a device provided at the machine body, and wherein the charging display is provided at a side wall of the exterior body that has a plate surface facing in the width direction of the machine body and is disposed between the pair of crawler traveling devices provided at the front portion of the machine body and the pair of crawler traveling devices provided at the rear portion of the machine body, the charging display being operable to report a state of the battery from the side wall outward in the width direction of the machine body.

* * * * *